(12) United States Patent
Radwin et al.

(10) Patent No.: US 11,450,148 B2
(45) Date of Patent: Sep. 20, 2022

(54) MOVEMENT MONITORING SYSTEM

(71) Applicant: WISCONSIN ALUMNI RESEARCH FOUNDATION, Madison, WI (US)

(72) Inventors: Robert Radwin, Waunakee, WI (US); Xuan Wang, Madison, WI (US); Yu Hen Hu, Middleton, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 57 days.

(21) Appl. No.: 16/874,883

(22) Filed: May 15, 2020

(65) Prior Publication Data
US 2020/0279102 A1 Sep. 3, 2020

Related U.S. Application Data

(63) Continuation-in-part of application No. 16/038,664, filed on Jul. 18, 2018, now Pat. No. 10,810,414, (Continued)

(51) Int. Cl.
*G06V 40/20* (2022.01)
*G06V 20/40* (2022.01)
*G06V 40/10* (2022.01)

(52) U.S. Cl.
CPC ............ *G06V 40/23* (2022.01); *G06V 20/46* (2022.01); *G06V 20/49* (2022.01); *G06V 40/103* (2022.01)

(58) Field of Classification Search
CPC ........... G06K 9/00342; G06K 9/00744; G06K 9/00765; G06K 9/00369; G06K 9/00771
See application file for complete search history.

(56) References Cited

U.S. PATENT DOCUMENTS 5,521,841 A    5/1996 Arman et al.
5,708,767 A    1/1998 Yeo et al.
(Continued)

FOREIGN PATENT DOCUMENTS

EP    1259076 A2    11/2002
EP    1403817 A1    3/2004
(Continued)

OTHER PUBLICATIONS

SangUk Han et al, ("A vision-based motion capture and recognition framework for behavior-based safety management", Automation in Construction 35 (2013) 131-141) (Year: 2013).*
(Continued)

*Primary Examiner* — Amara Abdi
(74) *Attorney, Agent, or Firm* — Seager, Tufte & Wickhem LLP

(57) ABSTRACT

A monitoring system or tracking system may include an input port and a controller in communication with the input port. The input port may receive video from one or more image capturing devices. The image capturing device is optionally part of the monitoring system and in some cases includes at least part of the controller. The controller may be configured to receive video via the input port and identify a subject within frames of the video relative to a background within the frames. Further, the controller may be configured to identify dimensions, posture, hand location, feet location, twisting position/angle, and/or other parameters of the identified subject in frames of the video and determine when the subject is performing a task. Based on the dimensions and/or other parameters identified or extracted from the video during the predetermined task, the controller may output via the output port assessment information.

22 Claims, 23 Drawing Sheets

Related U.S. Application Data which is a continuation-in-part of application No. 15/727,283, filed on Oct. 6, 2017, now Pat. No. 10,482,613.

(60) Provisional application No. 62/529,440, filed on Jul. 6, 2017.

(56) References Cited

U.S. PATENT DOCUMENTS

| | | | |
|---|---|---|---|
| 5,821,945 A | 10/1998 | Yeo et al. | |
| 5,828,809 A | 10/1998 | Chang et al. | |
| 5,969,755 A | 10/1999 | Courtney | |
| 5,974,235 A | 10/1999 | Nunally et al. | |
| 6,181,867 B1 | 1/2001 | Kenner et al. | |
| 6,222,532 B1 | 4/2001 | Ceccarelli | |
| 6,400,890 B1 | 6/2002 | Nagasaka et al. | |
| 6,424,370 B1 | 7/2002 | Courtney | |
| 6,445,409 B1 | 9/2002 | Ito et al. | |
| 6,628,835 B1 | 9/2003 | Brill et al. | |
| 6,643,387 B1 | 11/2003 | Sethuraman et al. | |
| 6,721,454 B1 | 4/2004 | Qian et al. | |
| 6,724,915 B1 | 4/2004 | Toklu et al. | |
| 6,754,389 B1 | 6/2004 | Dimitrova et al. | |
| 6,779,027 B1 | 8/2004 | Schunicht et al. | |
| 6,845,357 B2 | 1/2005 | Shetty et al. | |
| 6,879,709 B2 | 4/2005 | Tian et al. | |
| 6,940,474 B2 | 9/2005 | Weitbruch et al. | |
| 6,940,998 B2 | 9/2005 | Garoutte | |
| 7,020,336 B2 | 3/2006 | Cohen-Solal et al. | |
| 7,068,842 B2 | 6/2006 | Liang et al. | |
| 7,076,102 B2 | 7/2006 | Lin et al. | |
| 7,106,885 B2 | 9/2006 | Osterweil et al. | |
| 7,200,266 B2 | 4/2007 | Ozer et al. | |
| 7,227,569 B2 | 6/2007 | Maruya | |
| 7,330,566 B2 | 2/2008 | Cutler | |
| 7,346,186 B2 | 3/2008 | Sharoni et al. | |
| 8,009,918 B2 | 8/2011 | Van Droogenbroeck et al. | |
| 9,053,516 B2 | 6/2015 | Stempora | |
| 9,204,823 B2 | 12/2015 | Derenne et al. | |
| 9,566,004 B1 | 2/2017 | Radwin et al. | |
| 10,395,373 B1 | 8/2019 | Brewster et al. | |
| 2001/0010541 A1 | 8/2001 | Fernandez et al. | |
| 2001/0016007 A1 | 8/2001 | Wu et al. | |
| 2003/0042401 A1* | 3/2003 | Gartner | G01B 11/2545 |
| | | | 250/208.1 |
| 2003/0048926 A1* | 3/2003 | Watanabe | G06V 40/10 |
| | | | 382/103 |
| 2003/0051026 A1 | 3/2003 | Carter et al. | |
| 2003/0053659 A1 | 3/2003 | Pavlidis et al. | |
| 2003/0123703 A1 | 7/2003 | Pavlidis et al. | |
| 2003/0126293 A1 | 7/2003 | Bushey | |
| 2004/0080615 A1 | 4/2004 | Klein et al. | |
| 2004/0081333 A1 | 4/2004 | Grab et al. | |
| 2004/0120548 A1 | 6/2004 | Qian | |
| 2004/0130620 A1 | 7/2004 | Buehler et al. | |
| 2004/0141636 A1 | 7/2004 | Liang et al. | |
| 2006/0045185 A1 | 3/2006 | Kiryati et al. | |
| 2006/0204045 A1 | 9/2006 | Antonucci | |
| 2006/0215752 A1 | 9/2006 | Lee et al. | |
| 2006/0215753 A1 | 9/2006 | Lee et al. | |
| 2006/0227862 A1 | 10/2006 | Campbell et al. | |
| 2006/0239645 A1 | 10/2006 | Curtner et al. | |
| 2012/0065924 A1 | 3/2012 | Nielsen et al. | |
| 2012/0327220 A1 | 12/2012 | Ma | |
| 2013/0164722 A1 | 6/2013 | Yoshimitsu et al. | |
| 2013/0201147 A1 | 8/2013 | Paulsen et al. | |
| 2014/0003725 A1 | 1/2014 | Kawano | |
| 2014/0254863 A1 | 9/2014 | Marks et al. | |
| 2015/0002704 A1 | 1/2015 | Vidal-Naquet | |
| 2015/0154459 A1 | 6/2015 | Park | |
| 2015/0264357 A1 | 9/2015 | Alfonso | |
| 2015/0317780 A1* | 11/2015 | Dumont | G06T 7/85 |
| | | | 348/47 |
| 2016/0150219 A1* | 5/2016 | Gordon | H04N 13/271 |
| | | | 348/46 |
| 2017/0118539 A1* | 4/2017 | Lokshin | G11B 27/28 |
| 2017/0245806 A1* | 8/2017 | Elhawary | A61B 5/1122 |
| 2017/0296129 A1* | 10/2017 | Petterson | A61B 5/0022 |
| 2018/0089851 A1* | 3/2018 | Kuo | G06T 7/593 |
| 2018/0285634 A1 | 10/2018 | Varadarajan et al. | |
| 2018/0374233 A1 | 12/2018 | Zhou et al. | |
| 2020/0050839 A1 | 2/2020 | Wolf et al. | |

FOREIGN PATENT DOCUMENTS

| | | |
|---|---|---|
| JP | 2000276577 A | 10/2000 |
| JP | 2005295255 A | 10/2005 |
| WO | 0163576 A2 | 8/2001 |
| WO | 2007000637 A2 | 1/2007 |

OTHER PUBLICATIONS

Greene et al; "Visualizing stressful aspects of repetitive motion tasks and opportunities for ergonomic improvements using computer vision.", Applied Ergonomics, 2017.

Breiman et al; "Classification and re-gression trees". CRC press (2017), 1984.

Bao et al; "Quantifying repetitive hand activity for epidemiological research on musculoskeletal disorders—Part II: comparison of different methods of measuring force level and repetitiveness.", Ergonomics, 49(4), 381-392, 2006.

Safetyvideopreviews. Manual Material Handling/Safe Lifting. Retrieved from https://www.youtube.com/watch?v=rrl2n8qehrY&t=8s., 2012.

University of Michigan Center for Ergonomics. Paper Flopping—Job Modifica-tion. Retrieved from https://www.youtube.com/watch?v=61cu5qvH0kM&index=54&list=PLn5IJRj74S88mFFV6ObxS6nFdDXUFiGW, 2016.

University of Michigan Center for Ergonomics. Stacking, Facing Line2 CE. Re-trieved from https://www.youtube.com/watch?v=MxTgvuhVAJA&t=55s, 2017.

Lu et al; "Efficacy of the revised NIOSH lifting equation for predicting risk of low back pain associated with manual lifting: A one-year prospective study." Human Factors 56(1): 73-85 (2014).

Babapour et al; "Adoption of ergonomic features in a new reach truck cabin design—a usability study", Chalmers University of Technology, SE-412 96 Gothenberg, Sweden, IOS press and the authors, pp. 1486-1492, 2012.

Lipton, "ObjectVideo Forensics: Activity-Based Video Indexing and Retrieval for Physical Security Applications," ObjectVideo, pp. 1-18, date accessed 2009.

Lipton et al., "Critical Asset Protection, Perimeter Monitoring, and Threat Detection Using Automated Video Surveillance," ObjectVideo, pp. 1-11, date accessed 2009.

Mills et al., "A Magnifier Tool for Video Data," Human Interface Group/Advanced Technology, pp. 93-98, 1992.

Porikli et al., "Event Detection by Eigenvector Decomposition Using Object and Frame Features," Mitsubishi Electric Research Laboratories, pp. 1-10, 2004.

Smoliar et al., "Content-Based Video Indexing and Retrieval," IEEE Multimedia, vol. 1(2): 62-72, 1994.

Waters et al; Applications Manual for the Revised NIOSH Lifting Equation. U.S. Department of Health and Human Services. Publication No. 94-110. https://www.cdc.gov/niosh/docs/94-110/pdfs/94-110.pdf, 1994.

Zivkovic et al; "Efficient adaptive density estimation per image pixel for the task of background subtraction." Pattern recognition letters 27.7, 773-780, 2006.

Shoushtarian et al; "A practical adaptive approach for dynamic background subtraction using an invariant colour model and object tracking." Pattern Recognition Letters, 26(1):5-26, Jan. 2005.

Medioni et al., "Event Detection and Analysis from Video Streams," IEE Transactions on Pattern Analysis and Machine Intelligence, vol. 23 No. 8, pp. 873-889, Aug. 2001.

Radwin et al; "A frequency-duty cycle equation for the ACGIH hand activity level," Ergonomics. 58(2):173-183. doi:10.1080/00140139.2014.966154, 2015.

(56) References Cited

OTHER PUBLICATIONS

Sinop et al; "A Seeded Image Segmentation Framework Unifying Graph Cuts and Random Walker Which Yields A New Algorithm", Proc. of ICCV, 2007.
Rother et al; "GrabCut: Interactive foreground extraction using iterated graph cuts", ACM Trans. Graph., vol. 23, pp. 309-314, 2004.
Piccardi, Background subtraction techniques: a review (PDF). IEEE International Conference on Systems, Man and Cybernetics. 4. pp. 3099-3104, Oct. 2004.
Barnich et al; "ViBe: A universal background subtraction algorithm for video sequences." IEEE Transactions on Image processing 20.6 pp. 1709-1724. 2011.
Kim et al; "Real-time foreground-background segmentation using codebook model." Real-time imaging 11.3: 172-185. 2005.
Zivkovic, "Improved adaptive Gaussian mixture model for background subtraction." Pattern Recognition, 2004. ICPR 2004. Proceedings of the 17th International Conference on. vol. 2. IEEE, 2004.
Kim et al; "Performance evaluation of a wearable inertial motion capture system for capturing physical exposures during manual material handling tasks." Ergonomics 56.2 pp. 314-326, 2013.
Marras et al; "Instrumentation for measuring dynamic spinal load moment exposures in the workplace." Journal of Electromyography and Kinesiology 20.1 , 1-9. 2010.
Luinge et al; "Measuring orientation of human body segments using miniature gyroscopes and accelerometers." Medical and Biological Engineering and computing 43.2 pp. 273-282, 2005.
Borghetti et al. "Wearable Sensors for Human Movement Monitoring in Biomedical Applications: Case Studies." Ambient Assisted Living. Springer International Publishing, pp. 111-123, 2015.
Sedai et al; "A Gaussian process guided particle filter for tracking 3D human pose in video." IEEE Transactions on Image Processing 22. 11 pp. 4286-4300, 2013.
Drory et al; "A learning-based markerless approach for full-body kinematics estimation in-natura from a single image." Journal of Biomechanics 55 pp. 1-10, 2017.
Shotton et al. "Real-time human pose recognition in parts from single depth images." Communications of the ACM 56.1 : pp. 116-124. 2013.
Vemulapaali et al; "Human action recognition by representing 3d skeletons as points in a lie group." Proceedings of the IEEE conference on computer vision and pattern recognition. 2014.
Liu et al. "Silhouette-Based On-Site Human Action Recognition in Single-View Video." Construction Research Congress 2016.
Akkas et al; "Measuring ele-mental time and duty cycle using automated video processing." Ergonomics, 59(11), 1514-1525. 2016.
Bhattacharaya et al; Workers' Compensation Costs in Wholesale and Retail Trade Sectors. National Institute for Occupational Safety and Health . https://www.cdc.gov/NIOSH/docs/2013-147/pdfs/2013%E2%80%93147.pdf. 2012.
U.S. Bureau of Labor Statistics. 2015 Nonfatal Occupational Injuries and Illnesses: Cases with days away from work. (Nov. 2016) https://www.bls.gov/iif/oshwc/osh/case/osch0058.pdf.
National Institute for Organizational Safety & Health. Number, incidence rate, and median days away from work for nonfatal occupational injuries and illnesses involving days away from work for musculoskeletal disorders4 by part of body and ownership, Wisconsin, 2014. (2015) https://www.bls.gov/iif/oshwc/osh/case/wi2014_pob.pdf.
Hwang et al; "Lower extremity joint kinetics and lumbar curvature during squat and stoop lifting." BMC Musculoskeletal Disorders 2009 10:15 (Feb. 2009).
Plantard et al; "Validation of an ergonomic assessment method using Kinect data in real workplace conditions." Applied Ergonomics pp. 1-8. (2016).
Spector et al; "Automation of Workplace Lifting Hazard Assessment for Musculoskeletal Injury Prevention." Annals of Occupational and Environmental Medicine, 26:15. (2014).
Chaffin, "Development of Computerized Human Static Strength Simulation Model for Job Design." Human Factors and Ergonomics in Manufacturing, 7 (4) pp. 305-322. (1997).
University of Michigan Center for Ergonomics. 3DSSPP: Background Information. (2017). https://c4e.engin.umich.edu/tools-services/3dsspp-software/3dsspp-background-information/.
Burgess-Limerick et al; "Toward a Quantitative Definition of Manual Lifting Postures," Human Factors, 39 (1), pp. 141-148. http://journals.sagepub.com/doi/pdf/10.1518/001872097778940632. 1997.
Anderson et al; "A Biomechanical Model of the Lumbosacral Joint during Lifting Activities." Journal of Biomechanics, 18 (8), pp. 571-584. (1985).
Dysart et al; "Posture Prediction for Static Sagittal-Plane Lifting." Journal of Biomechanics, 29 (10), pp. 1393-1397. ). http://www.sciencedirect.com/science/article/pii/0021929096000280, Oct. 1996.
ACGIH (American Conference of Governmental Industrial Hygienists). TLV® / BEI® Introduction. http://www.acgih.org/tlv-bei-guidelines/tlv-bei-introduction (2017).
Straker, "Evidence to support using squat, semi-squat and stoop techniques to lift low-lying objects." International Journal of Industrial Ergonomics, 31, pp. 149-160. (2003).
Gordon et al; 2012 Anthropometric Survey of U.S. Army Personnel: Methods and Summary Statistics. (2014).
Mathworks. Decision Trees. https://www.mathworks.com/help/stats/classification-trees-and-regression-trees.html (2017).
Waters et al; "Revised NIOSH Equation for the design and evaluation of manual lifting tasks". Ergonomics, vol. 36, No. 7, 749-776, 1993.
Drinkaus et al; "Job Level Risk Assessment Using Task Level ACGIH Hand Activity Level TLV Scores: A Pilot Study", International Journal of Occupational Safety and Ergonomice (JOSE) vol. 11, No. 3, 263-281. 2005.
Chen et al. "Automated video exposure assessment of repetitive hand activity level for a load transfer task." Human Factors: The Journal of the Human Factors and Ergonomics Society , 55(2): 298-308. 2013.
Mark Wilson, "Testing Project Natal: We Touched the Intangible", http://gizmodo.com/5277954/testing-project-natal-we-touched-the-intangible/. Accessed Jun. 3, 2009.
Mike Schramm "Kinect: The company behind the tech explains how it works", http://www.joystiq.com/2010/06/19/kinect-how-it-works-from-the-company-behind-the-tech/. Accessed Jun. 19, 2010.
Alex Pham, "E3: Microsoft shows off gesture control technology for Xbox 360", http://latimesblogs.latimes.com/technology/2009/06/microsofte3.html. Accessed Jun. 1, 2009.
Stephen Totilo, "Natal Recognizes 31 Body Parts, Uses Tenth of Xbox 360 Computing Resources", http://kotaku.com/5442775/natal-recognizes-31-body-parts-uses-tenth-of-xbox-360-computing-resources. Accessed Jan. 1, 2010.
Burgess_Limerick, "Squat, stoop, or something in between?" International Journal of Industrial Ergonomics, 31, pp. 143-148. (2003).
Seo et al; "Automated Postural Ergonomic Assessment Using a Computer Vision-Based Posture Classification," Construction Research Congress, 2016.

* cited by examiner

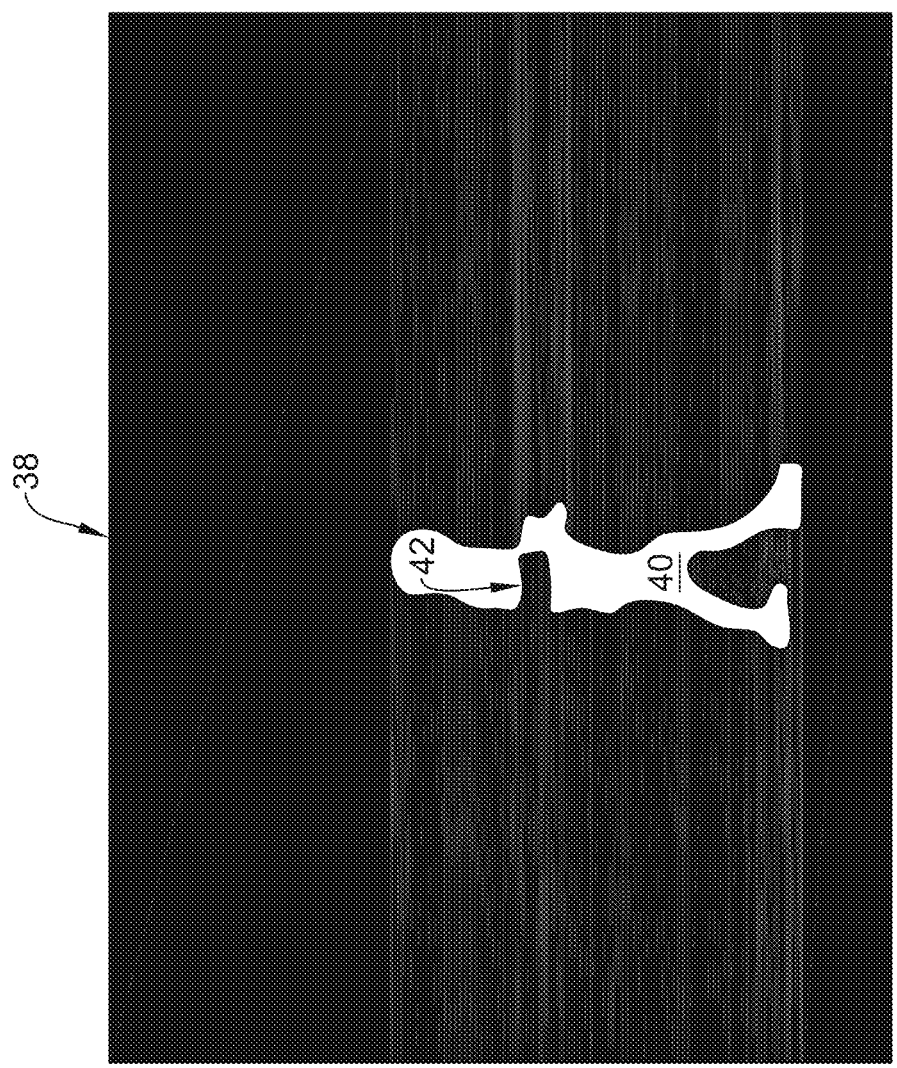

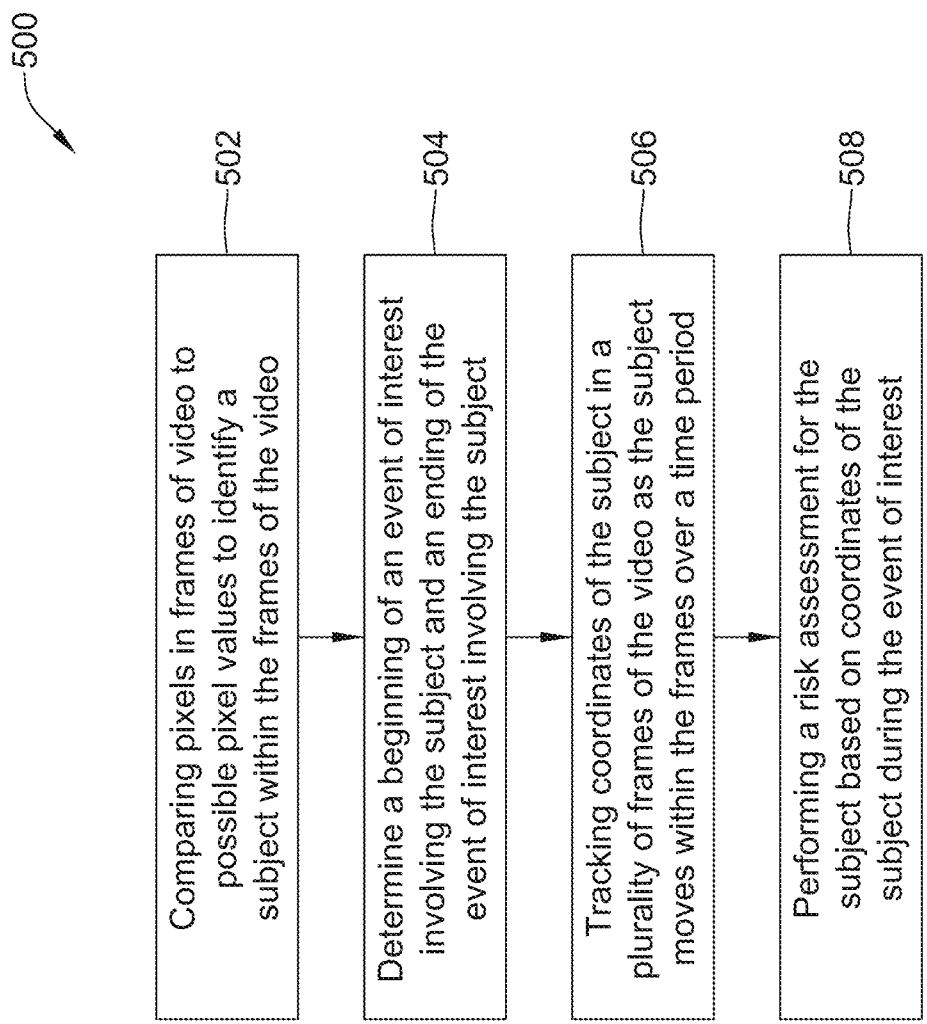

MOVEMENT MONITORING SYSTEM

CROSS REFERENCE TO RELATED APPLICATIONS

This application is a continuation-in-part of U.S. patent application Ser. No. 16/038,664, filed on Jul. 18, 2018, which is a continuation-in-part of U.S. patent application Ser. No. 15/727,283, filed on Oct. 6, 2017, now U.S. Pat. No. 10,482,613, which claims the benefit of U.S. Provisional Patent Application Ser. No. 62/529,440, filed on Jul. 6, 2017. The disclosures of these priority applications are incorporated by reference herein in their entireties.

STATEMENT REGARDING FEDERALLY SPONSORED RESEARCH OR DEVELOPMENT

This invention was made with government support under R01 OH011024 awarded by the Center for Disease Control and Prevention. The government has certain rights in the invention.

TECHNICAL FIELD

The present disclosure pertains to monitoring systems and assessment tools, and the like. More particularly, the present disclosure pertains to video analysis monitoring systems and systems for assessing risks associated with movement and exertions.

BACKGROUND

A variety of approaches and systems have been developed to monitor physical stress on a subject. Such monitoring approaches and systems may require manual observations and recordings, cumbersome wearable instruments, complex linkage algorithms, and/or complex three-dimensional (3D) tracking. More specifically, the monitoring approaches and systems may require detailed manual measurements, manual observations over a long period of time, observer training, sensors on a subject, and/or complex recording devices. Of the known approaches and systems for monitoring physical stress on a subject, each has certain advantages and disadvantages.

SUMMARY

This disclosure is directed to several alternative designs for, devices of, and methods of using monitoring systems and assessment tools. Although it is noted that monitoring approaches and systems are known, there exists a need for improvement on those approaches and systems.

Accordingly, one illustrative instance of the disclosure may include a marker-less subject tracking system. The tracking system may include an input port and a controller in communication with the input port. The input port may receive video of a subject performing a task. The controller may be configured to identify one of a beginning of the task performed by the subject in the video and an ending of the task performed by the subject in the video. The controller may be configured to determine a twisting position of the subject performing the task in the video.

Alternatively or additionally to any of the embodiments above, the twisting position of the subject performing the task in the video may be determined for a time when each of the identified one of the beginning of the task performed by the subject in the video and the ending of the task performed by the subject in the video occurs.

Alternatively or additionally to any of the embodiments above, the controller may be configured to identify a frame in the video at which each of the identified one of the beginning of the task performed by the subject in the video and the ending of the task performed by the subject in the video occurs, and determine the twisting position of the subject in the frame in the video at which each of the identified one of the beginning of the task performed by the subject in the video and the ending of the task performed by the subject in the video occurs.

Alternatively or additionally to any of the embodiments above, the controller may be configured to identify the one of the beginning of the task performed by the subject in the video and the ending of the task performed by the subject in the video based on determining when a ghost effect first appears in the video.

Alternatively or additionally to any of the embodiments above, the controller may be configured to determine a frame in the video at which the ghost effect first appears and identify the frame as when the identified one of the beginning of the task performed by the subject in the digital and the ending of the task performed by the subject in the video occurs.

Alternatively or additionally to any of the embodiments above, the controller may be configured to identify when the task begins based on determining a frame in the video in which a first ghost effect first appears, and identify when the task ends based on determining a frame in the video in which a second ghost effect first appears.

Alternatively or additionally to any of the embodiments above, the controller may be configured to identify a location of hands of the subject in the video at the identified one of the beginning of the task performed by the subject in the video and the ending of the task performed by the subject in the video based on a location of the ghost effect in the digital video.

Alternatively or additionally to any of the embodiments above, the controller may be configured to determine the twisting position of the subject performing the task in the video based on the location of hands of the subject in the video at the identified one of the beginning of the task performed by the subject in the video and the ending of the task performed by the subject in the video based on the location of the ghost effect in the video.

Alternatively or additionally to any of the embodiments above, the controller may be configured to identify a location of hands of the subject in the video and determine the twisting position of the subject performing the task in the video based on the location of the hands of the subject in the video.

Alternatively or additionally to any of the embodiments above, the controller may be configured to identify a location of a first feature of the subject in a frame of the video, identify a location of a second feature of the subject in the frame of the video, and determine the twisting position of the subject in the frame of the video based on the identified location of the first feature of the subject and the identified location of the second feature of the subject.

Alternatively or additionally to any of the embodiments above, the video may include a first video from a first camera and a second video from a second camera. The controller may be configured to determine a position of the first camera relative to a position of the second camera based on the first video and the second video, determine three-dimensional locations of a first set of features of the subject performing the task in the video based on the position of the first camera relative to the position of the second camera, the first set of features as captured in the first video, and the first set of features as captured in the second video, and determine three dimensional locations of a second set of features of the subject performing the task in the video based on the position of the first camera relative to the position of the second camera, the second set of features as captured in the first video, and the second set of features as captured in the second video.

Alternatively or additionally to any of the embodiments above, the controller may be configured to determine the twisting position of the subject performing the task in the video based on the determined three-dimensional locations of the first set of features of the subject performing the task in the video and the determined three-dimensional locations of the second set of features of the subject performing task in the video.

In another illustrative instance of the disclosure, a computer readable medium may have stored thereon in a non-transitory state a program code for use by a computing device. The program code may cause the computing device to execute a method for tracking a subject in video comprising identifying a subject within a frame of video, identifying one of a beginning of a task performed by the subject in the video and an ending of the task performed by the subject in the video, and determining a twisting position of the subject performing the task in the video.

Alternatively or additionally to any of the embodiments above, determining the twisting position of the subject performing the task in the video may include determining the twisting position of the subject performing the task in the video for a time at which the identified one of the beginning of the task performed by the subject in the video and the ending of the task performed by the subject in the video occurs.

Alternatively or additionally to any of the embodiments above, the method for tracking a subject in the video further include identifying a frame in the video at which the identified one of the beginning of the task performed by the subject in the video and the ending of the task performed by the subject in the video occurs, and determining the twisting position of the subject in the frame in the video at which the identified one of the beginning of the task performed by the subject in the video and the ending of the task performed by the subject in the video occurs.

Alternatively or additionally to any of the embodiments above, the identifying the one of a beginning of the task performed by the subject in the video and an ending of the task performed by the subject in the video is based on when a ghost effect first appears in the video.

Alternatively or additionally to any of the embodiments above, the method for tracking a subject in the video further include identifying a location of a first feature of the subject in a frame of the video and identifying a location of a second feature of the subject in the frame of the video. The determining the twisting position of the subject in the frame of the video may be based on the identified location of the first feature of the subject and the identified location of the second feature of the subject.

In another illustrative instance of the disclosure, a markerless tracking system may include a processor and memory in communication with the processor. The memory may include instructions executable by the processor to identify a first set of coordinates of body feature points of a subject in two-dimensional video from a first camera, identify a second set of coordinates of the body feature points of the subject in two-dimensional video from a second camera; and determine a body asymmetry angle of the subject in the video based on the first set of coordinates of the body feature points and the second set of coordinates of body feature points.

Alternatively or additionally to any of the embodiments above, the instructions may be executable by the processor to determine a set of three-dimensional coordinates of the body feature points based on the first set of coordinates and the second set of coordinates.

Alternatively or additionally to any of the embodiments above, the body asymmetry angle of the subject in the video determined based on the first set of coordinates and the second set of coordinates may be determined based on the set of three-dimensional coordinates of the body feature points.

The above summary of some example embodiments is not intended to describe each disclosed embodiment or every implementation of the disclosure.

BRIEF DESCRIPTION OF THE DRAWINGS

The disclosure may be more completely understood in consideration of the following detailed description of various embodiments in connection with the accompanying drawings, in which:

FIG. 7 is a schematic view of an illustrative segmented frame of video depicting a result from comparing the frame of video in FIG. 6B with the reference frame of FIG. 6A;

FIG. 18 is a schematic flow diagram of an illustrative method of performing a risk assessment.

Figure 1:
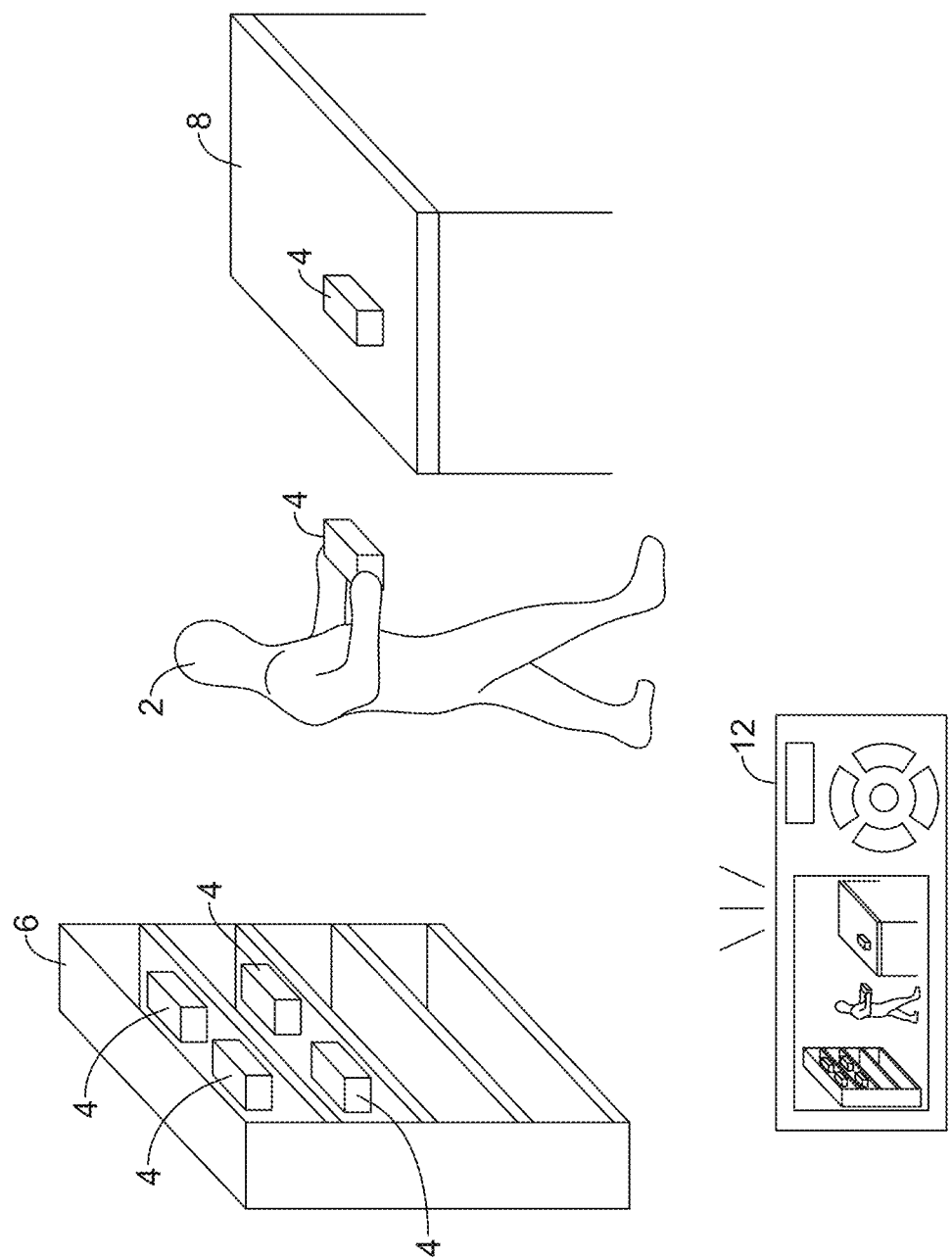
FIG. 1 is a schematic view of an illustrative monitoring system capturing images of a task being performed.

While the disclosure is amenable to various modifications and alternative forms, specifics thereof have been shown by way of example in the drawings and will be described in detail. It should be understood, however, that the intention is not to limit aspects of the claimed disclosure to the particular embodiments described. On the contrary, the intention is to cover all modifications, equivalents, and alternatives falling within the spirit and scope of the claimed disclosure.

DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the claimed disclosure. The illustrative embodiments depicted are intended only as exemplary. Selected features of any illustrative embodiment may be incorporated into an additional embodiment unless clearly stated to the contrary.

Physical exertion is a part of many jobs. For example, manufacturing and industrial jobs may require workers to perform manual lifting tasks (e.g., an event of interest or predetermined task). In some cases, these manual lifting tasks may be repeated throughout the day. Assessing the worker's movements and/or exertions while performing tasks required by manufacturing and/or industrial jobs and/or movements of workers in other jobs or activities may facilitate reducing injuries by identifying movement that may put a worker at risk for injury.

Repetitive work (e.g., manual work or other work) may be associated with muscle fatigue, back strain, injury, and/or other pain as a result of stress and/or strain on a person's body. As such, repetitive work (e.g., lifting, etc.) has been studied extensively. For example, studies have analyzed what is a proper posture that reduces physical injury risk to a minimum while performing certain tasks and have also analyzed how movement cycles (e.g., work cycles) and associated parameters (e.g., a load, a horizontal location of the origin and destination of the motion (e.g., a lift motion or other motion), a vertical location of the origin and destination of the motion, a distance of the motion, a frequency of the motion, a duration of the movement, a twisting angle during the motion, a coupling with an object, etc.) relate to injury risk. Additional parameters associated with movement cycles that may contribute to injury risk may include the speed/velocity and acceleration of movement of the subject, an angle of a body of the subject (e.g., a twisting position/angle (such as an asymmetry angle), a trunk angle, etc.), and/or an object moved at an origin and/or destination of movement. Some of these parameters may be used to identify a person's risk for an injury during a task based on guidelines such as the National Institute for Occupational Safety and Health (NIOSH) lifting equation (e.g., the revised NIOSH lifting equation) or the American Conference of Governmental Industrial Hygienists (ACGIH) Threshold Limit Value (TLV) for manual lifting, among others. Additionally, some of the above-noted parameters (e.g., an asymmetry angle, etc.) have been shown to be indicative of injury risk (e.g., risk of lower back pain (LBP) or lower back disorders (LBD), etc.), but may not have typically been utilized in a meaningful manner when identifying a person's risk for injury during a task due to it being difficult to obtain consistent and accurate measurements of the parameters.

In order to control effects of repetitive work on the body, quantification of parameters such as posture assumed by the body while performing a task, the origin and/or destination of objects lifted during a task, duration of the task, position assumed by the body during the task, twisting angle/position (e.g., a trunk asymmetry angle) of the body during the task, twisting angle/position of the body at the beginning and/or ending of the task, and frequency of the task, among other parameters, may facilitate evaluating an injury risk for a worker performing the task. A limitation, however, of identifying postures, the origin and destination of movement or moved objects, twisting angles/positions, and/or analyzing movement cycles is that it can be difficult to extract parameter measurements from an observed scene during a task.

In some cases, wearable equipment may be used to obtain and/or record values of parameters in an observed scene during a task. Although the wearable equipment may provide accurate sensor data, such wearable equipment may require a considerable set-up process, may be cumbersome, and may impede the wearer's movements and/or load the wearer's body, and as a result, may affect performance of the wearer such that the observed movements are not natural movements made by the wearer when performing the observed task. Furthermore, it is difficult to identify an actual context of signals obtained from wearable instruments alone. Thus, it may be desirable to observe a scene during a task without the use of wearable equipment.

Observing a scene without directly affecting movement of the person performing the task may be accomplished by recording the person's movements using video. In some cases, complex 3D video equipment and measurement sensors may be used to capture video of a person performing a task. However, complex 3D video systems and/or measurement sensors may be cumbersome and may interfere with work activity.

Recorded video (e.g., image data of the recorded video) may be processed in one or more manners to identify and/or extract parameters from the recorded scene. Some approaches for processing the image data may include recognizing a body of the observed person and each limb associated with the body in the image data. Once the body and limbs are recognized, motion parameters of the observed person may be analyzed. Identifying and tracking the body and the limbs of an observed person, however, may be difficult and may require complex algorithms and classification schemes. Such difficulties in identifying the body and limbs extending therefrom stem from the various shaped bodies and limbs may take and a limited number of distinguishable features for representing the body and limbs as the observed person changes configurations (e.g., postures) while performing a task.

This disclosure discloses approaches for analyzing video of a subject performing a task, such as a lifting task or other suitable task, (e.g., recorded with virtually any digital camera) that do not require complex classification systems, which results in approaches that use less computing power and take less time for analyses than the more complex and/or cumbersome approaches discussed above. In some cases, the approaches may be, or may be embodied in, a marker-less tracking system. The marker-less tracking system may identify feature points of a subject (e.g., a body of interest, a person, an animal, a machine and/or other subject) and a contour, or a portion of a contour, of the subject and determine parameter measurements from the subject in one or more frames of the video (e.g., a width dimension and/or a height dimension of the subject, a location of hands and/or feet of a subject, a distance between hands and feet of the subject, when the subject is beginning and/or ending a task, and/or other parameter values, locations of wrists of the subject, locations of hips of the subject, locations of other suitable joints of the subject, etc.)

In some cases, a bounding box (described in greater detail below) may be placed around the subject and the dimension of the bounding box may be used for determining one or more parameter values and/or position assessment values relative to the subject. In another example, three-dimensional coordinates of features points of the subject performing the task may be determined, without a complex 3D tracking system, once the subject in the video is identified. The dimensions of the bounding box, other parameters of the bounding box or the subject, and/or coordinates of feature points of the subject may be utilized for analyzing positions and/or movements of the subject and providing position assessment information of the subject using lifting guidelines, including, but not limited to, the NIOSH Lifting Equation and the ACGIH TLV for manual lifting. Although the NIOSH and ACGIH equations are discussed herein, other equations and/or analyses may be performed when doing a risk assessment of movement in a video.

The NIOSH Lifting Equation is a tool used by safety professionals to assess manual material handling jobs and provides an empirical method for computing a weight limit for manual lifting. The NIOSH Lifting Equation takes into account measurable parameters including a vertical and horizontal location of a lifted object relative to a body of a subject, duration and frequency of the task, a distance the object is moved vertically during the task, a coupling or quality of the subject's grip on the object lifted/carried in the task, and an asymmetry angle or twisting required during the task. A primary product of the NIOSH Lifting Equation is a Recommended Weight Limit (RWL) for the task. The RWL prescribes a maximum acceptable weight (e.g., a load) that nearly all healthy employees could lift over the course of an eight (8) hour shift without increasing a risk of musculoskeletal disorders (MSD) to the lower back. A Lifting Index (LI) may be developed from the RWL to provide an estimate of a level of physical stress on the subject and MSD risk associated with the task.

The NIOSH Lifting Equation for a single lift is:

$$LC \times HM \times VM \times DM \times AM \times FM \times CM = RWL \quad (1)$$

LC, in equation (1), is a load constant of typically 51 pounds, HM is a horizontal multiplier that represents a horizontal distance between a held load and a subject's spine, VM is a vertical multiplier that represents a vertical height of a lift, DM is a distance multiplier that represents a total distance a load is moved, AM is an asymmetric multiplier that represents an angle between a subject's sagittal plane and a plane of asymmetry (the asymmetry plane may be the vertical plane that intersects the midpoint between the ankles and the midpoint between the knuckles at an asymmetric location), FM is a frequency multiplier that represents a frequency rate of a task, and CM is a coupling multiplier that represents a type of coupling or grip a subject may have on a load. The Lifting Index (LI) is defined as:

$$(\text{Weight lifted})/(\text{RWL}) = LI \quad (2)$$

The "weight lifted" in equation (2) may be the average weight of objects lifted during the task or a maximum weight of the objects lifted during the task. The NIOSH Lifting Equation is described in greater detail in Waters, Thomas R. et al., "Revised NIOSH equation for the design and evaluation of manual lifting tasks", ERGONOMICS, volume 36, No. 7, pages 749-776 (1993), which is hereby incorporated by reference in its entirety.

The ACGIH TLVs are a tool used by safety professionals to represent recommended workplace lifting conditions under which it is believed nearly all workers may be repeatedly exposed day after day without developing work-related low back and/or shoulder disorders associated with repetitive lifting tasks. The ACGIH TLVs take into account a vertical and horizontal location of a lifted object relative to a body of a subject, along with a duration and frequency of the task. The ACGIH TLVs provide three tables with weight limits for two-handed mono-lifting tasks within thirty (30) degrees of the sagittal (i.e., neutral forward) plane. "Mono-lifting" tasks are tasks in which loads are similar and repeated throughout a work day.

Certain parameters related to a subject performing a task (e.g., lifting and/or moving objects or any other task) may be and/or have been weighted less than other parameters when doing an injury risk assessment, for example, because it was difficult to determine, measure, and/or quantify the parameters. For example, in some cases, a subject's grip on an object and/or an angle of twisting (e.g., an asymmetry angle) while holding the object has been more difficult to determine and thus weighted less in an injury risk assessment than a frequency of the task, the speed of the task, the acceleration of the task, the distance from the hands to the feet of the subject when performing the task, the posture of the subject while performing the task, and/or other parameters, which have typically been easier to quantify. However, the weight applied to a parameter may differ for different tasks and/or analyses. In some cases, parameters weighted less than others may be neglected and not used during analyses of movement of the subject in the video, as long as it is noted that the parameters were not used in the analyses.

A disclosed approach for analyzing recorded video of a task (e.g., a two-dimensional (2D) or 3D video depicting lifts in a sagittal plane and/or one or more similar or different tasks) may include extracting simple features from the video, rather than using complex linkage models generally used in motion tracking. This approach may incorporate segmenting a subject (e.g., a foreground) from a background via subtraction and then extracting motion parameters from subject (e.g., a bounded foreground or other foreground), which does not require complex limb tracking.

In some cases, a shape (e.g., a two-dimensional shape, such as a bounding box) may be manually drawn or drawn in an automated manner (e.g., computationally with a computing device) tightly around the subject and the dimensions of the shape (e.g., a maximum height and a maximum width) may be indicative of the position and/or other parameters of the subject as the subject moves. In one example, dimensions of a shape extending around the subject may indicate a posture of the subject. Further, in segmented frames of the video ghost effects of objects moved during a task (e.g., effects seen when a moving object becomes static and separated from the subject and/or when a static object starts to move) may be identified to determine a beginning and/or ending of a task performed by the subject, determine hand locations, hand locations relative to feet, to infer loading/unloading locations of the subject, determine an orientation of the subject, and/or determine one or more other parameters relative to the subject. Based on extracted quantities from the dimensions of the subject in segmented frames of the video (e.g., horizontal and vertical distance between the hands and feet, etc.), frequency of a task, speed of the subject during the task, acceleration of the subject or object moved during the task, and/or other parameters may be determined and/or analyzed (e.g., in the NIOSH Lifting Equation, in the ACGIH TLV for Manual Lifting, and/or in one or more other equations or analyses).

Dimensions, such as a height dimension (e.g., a maximum height dimension), a width dimension (e.g., a maximum width dimension) and/or other dimensions, of the subject in a segmented frame of the video may be obtained to provide position information (e.g., posture or other position information) for the subject in frames of the video. Position information for the subject in frames of the video may include, but is not limited to, determining joint angles of the subject and/or determining whether the subject is in a stooping position, bending position, squatting position, standing position, twisting position, etc. In some cases, position information for the subject in frames of the video may be determined based on locating joints of the subject in the video, as discussed in greater detail below.

Joint locations or other body feature locations used to determine position information may be identified using computer vision algorithms. In some cases, 2D coordinate locations of the joints or other features of a subject in 2D video may be identified and 3D coordinates of the joints or other features of the subject may be determined based on the identified 2D coordinates. Two-dimensional video from one or more cameras may be utilized to determine the 3D coordinates of joints or other features of the subject.

In one example of determining 3D coordinates of joints or other features of the subject, two 2D cameras (e.g., a first 2D camera and a second 2D camera) may be utilized to record separate videos of the subject performing a task (e.g., a lifting task and/or other suitable task). A computer vision algorithm (e.g., OPENPOSE™ and/or other suitable computer vision algorithms) may be applied to the video from each camera to determine 2D coordinates of various joints or other features of the subject while the subject is performing the task in the video. When the videos from the 2D cameras are synchronized, a computer vision algorithm (e.g., a structure from motion (SfM) algorithm and/or other suitable algorithm) may be applied to video from the cameras to determine camera positions relative to one another and orientations of the cameras. Then, based on the 2D coordinates identified and the relative camera positions and/or orientations, 3D coordinates of joint positions or positions of other features of the subject may be identified and used to establish position information (e.g., twisting/position angle, etc.) of the subject performing the task in the video. However, other suitable computer vision techniques using video from only a single camera, from two cameras, and/or from more than two cameras may be utilized for determining 3D locations (e.g., coordinates and/or other suitable locations) of the subject and/or other features in the video.

One or more techniques may be applied to video to analyze video and determine 2D coordinates of various joints or other features of the subject while the subject is performing the task in the video. Example techniques, among other suitable techniques, are described in: Cao, Zhe, et al. "Realtime multi-person 2d pose estimation using part affinity fields." *Proceedings of the IEEE Conference on Computer Vision and Pattern Recognition*. 2017, which is hereby incorporated by references in its entirety for all purposes; Fang, H. S., et al. "Rmpe: Regional multi-person pose estimation." *Proceedings of the IEEE International Conference on Computer Vision*. 2017, which is hereby incorporated by references in its entirety for all purposes; Newell, B., Yang, K., and Deng, J., "Stacked hourglass networks for human pose estimation" *CoRR*, Vol. abs/1603.06937.2016, which is hereby incorporated by references in its entirety for all purposes; and Sun, K., Xiao, B., Liu, D., and Wang, J., "Deep high-resolution representation learning for human pose estimation," in *CVPR*, 2019, which is hereby incorporated by references in its entirety for all purposes.

Figure 3:
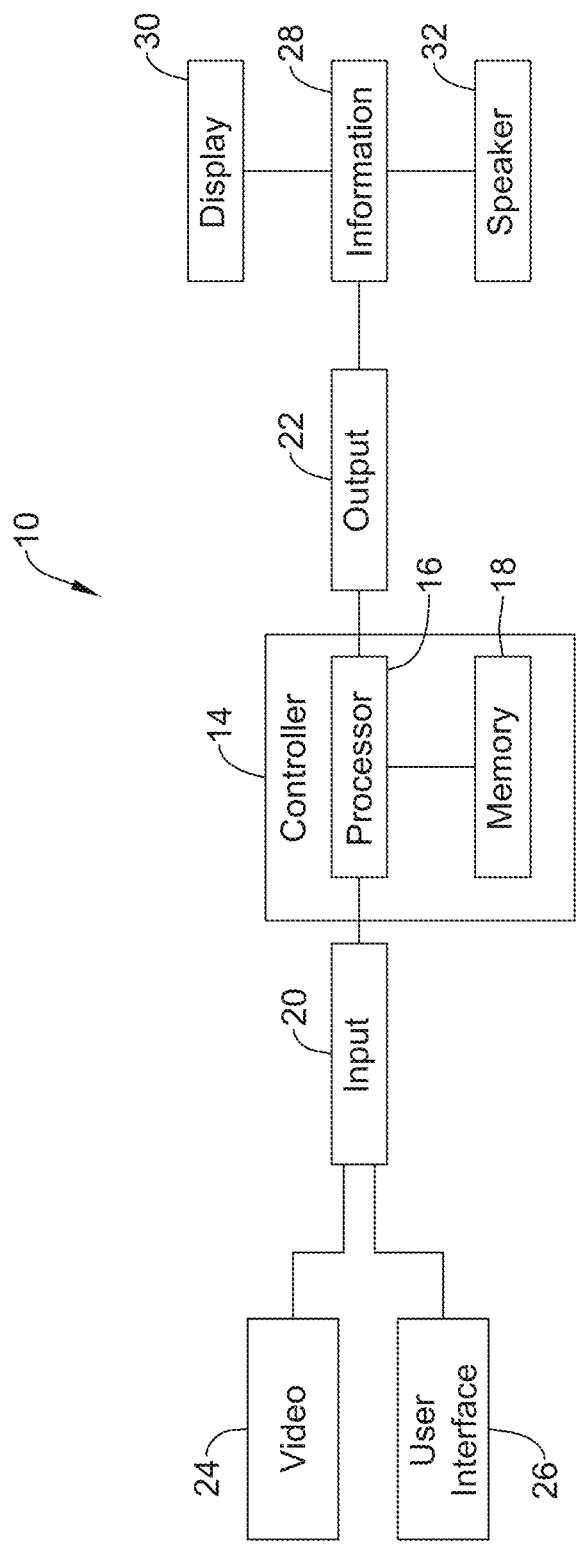
FIG. 3 is a schematic box diagram of an illustrative monitoring system.
Figure 4:
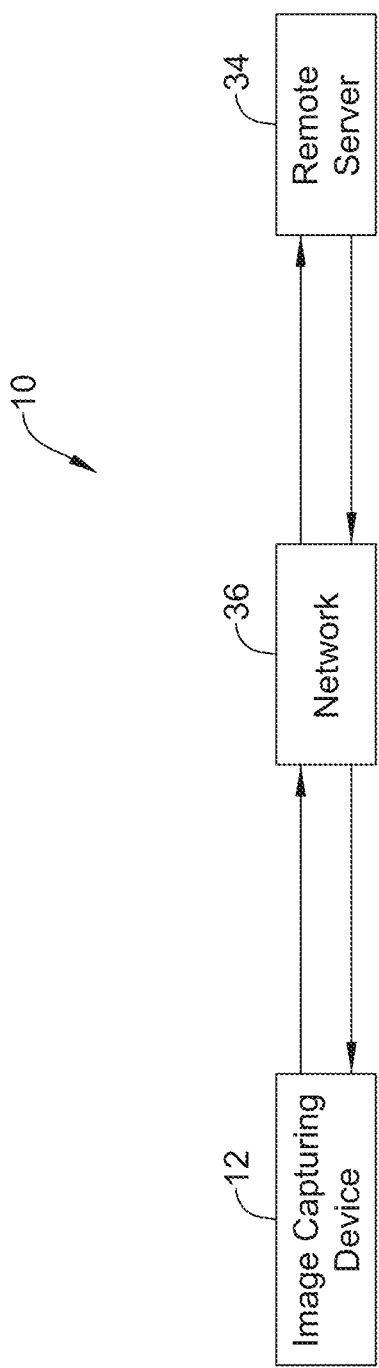
FIG. 4 is a schematic box diagram depicting an illustrative flow of data in a monitoring system.

Turning to the Figures, FIG. 1 is a schematic view of an image capturing device 12 of an illustrative tracking and/or monitoring system (e.g., a tracking or monitoring system 10, as shown in FIGS. 3 and 4) set up to observe a subject 2 perform a task (e.g., moving objects 4 from a shelf 6 to a table 8, as shown in FIG. 1, or other task). The image capturing device 12 may be or may include one or more of a phone (e.g., a camera-equipped smart phone or other phone), a portable digital camera, a dedicated digital camera (e.g., a security camera or other dedicated camera), a digital camcorder, a tablet computer, a laptop, a desktop, and/or a suitable other electronic device capable of recording video.

Although the shelf 6 and the table 8 used in the performed task that is depicted in FIG. 1 are spaced from one another such that the subject 2 may be required to traverse a distance between the shelf 6 and the table 8, the shelf 6 and the table 8 may be a suitable distance apart for a task that is less than or greater than what is depicted in FIG. 1. Additionally or alternatively, elements other than the shelf 6 and the table 8 may be utilized when performing a task monitored with the monitoring system 10 or other monitoring system.

Video of the subject 2 performing a task may be captured with the image capturing device(s) 12 set up at a suitable angle relative to a sagittal plane and/or other portion of the subject 2 in the video. For example, the image capturing device 12 may be at an angle of 90 degrees (perpendicular) to the sagittal plane of the subject 2, 60 degrees to the sagittal plane of the subject 2, 120 degrees to the sagittal plane of the subject 2, within the range of 60 to 120 degrees to the sagittal plane of the subject 2, and/or within one or more other suitable ranges of angles relative to the sagittal plane of the subject 2 The angles of the image capturing device 12 relative to the subject 2 may be measured from a center of a field of view of the image capturing device 12 and/or other suitable reference point. Positioning of the image capturing device(s) 12 relative to the subject 2 may be configured to facilitate observing one or more parameters of the subject 2 including, but not limited to, a posture of the subject 2, movement of the subject 2, and/or other suitable parameters of the subject 2.

In some cases, video of the subject 2 performing a task may be captured with two or more image capturing devices 12. When two or more image capturing devices 12 are used, it may be possible to capture video of the subject 2 performing a task at the above-noted angles relative to the sagittal plane of the subject 2 and/or at additional or alternative angles relative to the sagittal plane of the subject 2. Additionally or alternatively, although 2D data is primarily discussed herein as being captured by the image capturing device(s) 12, the image capturing device(s) 12 may be utilized to capture 3D image data of the subject 2 and such 3D image data may be utilized to analyze a task performed by the subject 2 in a manner similar to those described herein for captured 2D data.

Figure 2:
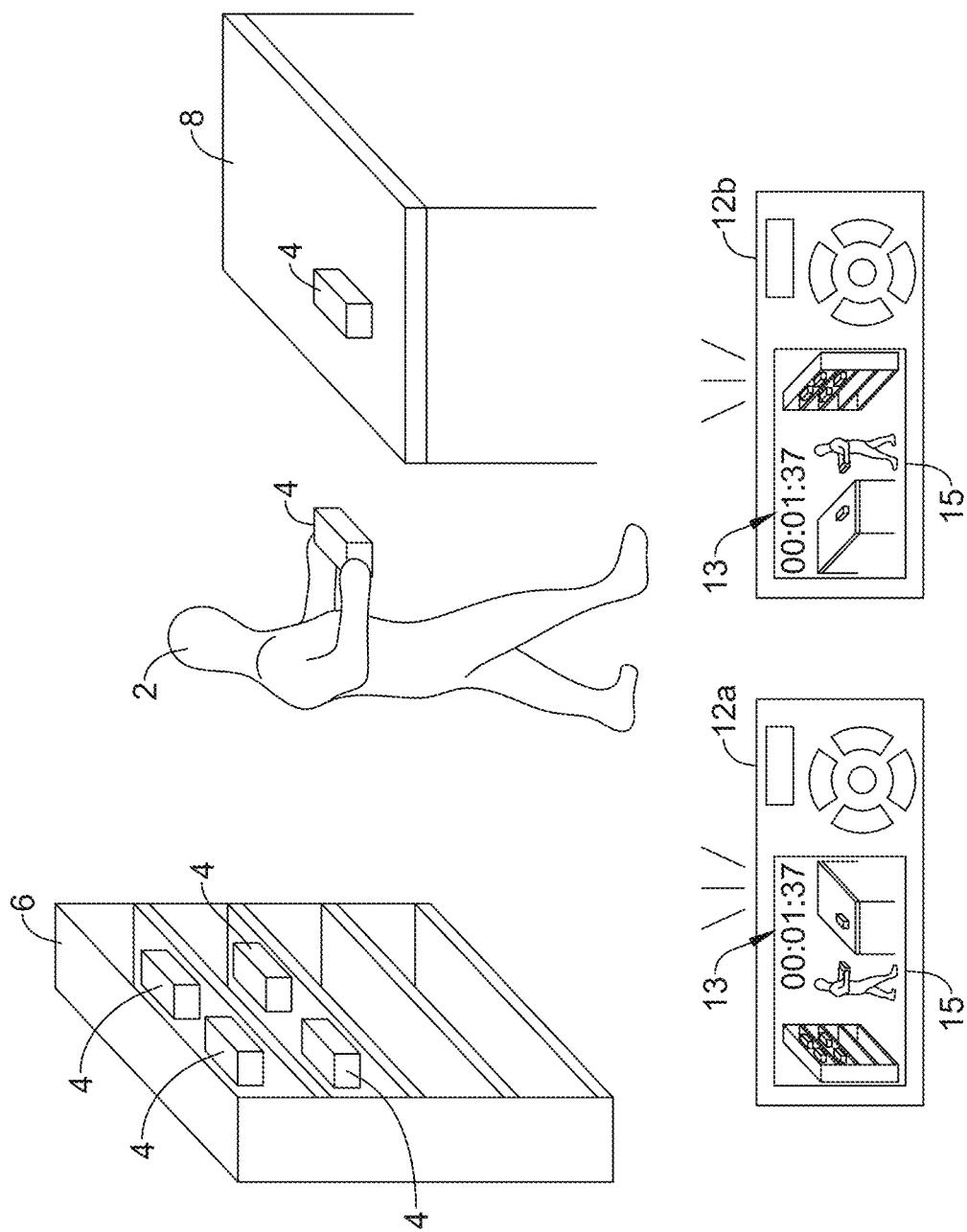
FIG. 2 is a schematic view of an illustrative monitoring system capturing images of a task being performed with two image capturing devices.

FIG. 2 depicts a schematic view of a first image capturing device 12a and a second image capturing device 12b of an illustrative tracking and/or monitoring system (e.g., the tracking or monitoring system 10, as shown in FIGS. 3 and 4) set up to observe the subject 2 perform the task (e.g., moving the objects 4 from the shelf 6 to the table 8, as shown in FIG. 1, or other suitable task). As the first image capturing device 12a and the second image capturing device 12b may be located at different positions, the image capturing devices 12a, 12b may capture the subject 2 performing the task at different angles relative to the subject 2. Although the first imaging capturing device 12a and the second image capturing device 12b are depicted side-by-side in FIG. 2, as can be seen in displays 15 of the respective first and second image capturing devices 12a, 12b, the second image capturing device 12b is capturing a view on an opposite side of the subject 2 performing the task from the first image capturing device 12a. The first and second image capturing devices 12a, 12b may be positioned perpendicular to movement of the subject 2 during the task, but this is not required.

In some cases, the two image capturing devices 12a, 12b may be synchronized so as to be capturing a scene at a same elapsed time (e.g., see the same elapsed time 13 in the first image capturing device 12a and in the second image capturing device 12b) and/or frame of video at the same time (e.g., the elapsed time 13 may be in frames and/or one or more other measures of time, rather than in hours:minutes:seconds units, as shown in FIG. 2). Although a single image capturing device 12 and/or two or more image capturing devices 12 may be utilized for a variety of reasons, two or more image capturing devices 12 may facilitate identifying 3D points of features in the 2D video captured by the image capturing devices 12, which may facilitate determining position information for performing a risk assessment on the subject 2 performing the task in the video.

The monitoring system 10 may take on one or more of a variety of forms and the monitoring system 10 may include or may be located on one or more electronic devices. In some cases, the image capturing device(s) 12 of the monitoring system 10 may process the recorded video thereon. Alternatively, or in addition, the image capturing device 12 may send, via a wired connection or wireless connection, at least part of the recorded video or at least partially processed video to a computing device (e.g., a laptop, desktop computer, server, a smart phone, a tablet computer, and/or other computer device) included in or separate from the monitoring system 10 for processing.

FIG. 3 depicts a schematic box diagram of the monitoring or tracking system 10. The monitoring or tracking system 10, as depicted in FIG. 3, may include a controller 14 having a processor 16 (e.g., a microprocessor, microcontroller, or other processor) and memory 18. Further, the monitoring or tracking system 10 may include an input port 20 and an output port 22 configured to communicate with one or more components in communication with the controller 14 and/or with one or more remote devices over a network (e.g., a single network or two or more networks). The input port 20 may be configured to receive inputs such as data or video 24 (e.g., digital video and/or other video from the image capturing device 12, as shown in FIG. 1), instructions from a user interface 26 (e.g., a display, keypad, touch screen, mouse, stylus, microphone, and/or other user interface device), communication signals, and/or other suitable inputs. The output port 22 may be configured to output information 28 (e.g., alerts, alarms, analysis of processed video, and/or other information), control signals, and/or communication signals to a display 30 (a light, LCD, LED, touch screen, and/or other display), a speaker 32, and/or other suitable devices having an electrical component. In some cases, the display 30 and/or the speaker 32, when included, may be components of the user interface 26, but this is not required, and the display 30 and/or the speaker 32 may be, or may be part of, a device or component separate from the user interface 26. In some cases, the controller 14 may include a timer (not shown). The timer may be integral to the processor 16 or may be provided as a separate component.

The input port 20 and/or the output port 22 may be configured to receive and/or send information and/or communication signals using one or more protocols. For example, the input port 20 and/or the output port 22 may communicate with other devices or components using a wired connection, ZigBee, Bluetooth, WiFi, IrDA, dedicated short range communication (DSRC), Near-Field Communications (NFC), EnOcean, and/or any other suitable common or proprietary wired or wireless protocol, as desired.

In some cases, the image capturing device 12 may provide the video 24, the user interface 26, the display 30, and/or the speaker 32 and may be part of the monitoring or tracking system 10 or separate from the monitoring or tracking systems 10. When one or more of the image capturing device 12, the user interface 26, the display 30, and/or the speaker 32 are part of the monitoring system 10, the features of the monitoring system 10 may be in a single device (e.g., two or more of the capturing device 12, controller 14, the user interface 26, the display 30, the speaker 32, and/or other suitable components may all be in a single device) or may be in multiple devices (e.g., the image capturing device 12 may be a separate device that the display 30, but this is not required). In some cases, the monitoring or tracking system 10 may exist substantially entirely in a computer readable medium (e.g., memory 18, other memory, or other computer readable medium) having instructions (e.g., a control algorithm or other instructions) stored in a non-transitory state thereon that are executable by a processor (e.g., the processor 16 or other processor) to cause the processor to perform the instructions.

The memory 18 of the controller 14 may be in communication with the processor 16. The memory 18 may be used to store any desired information, such as the aforementioned monitoring or tracking system 10 (e.g., a control algorithm), recorded video, parameters values (e.g., frequency, speed, acceleration, angles, start/end of a task, etc.) extracted from video, thresholds, equations for use in analyses (e.g., NIOSH Lifting Equation, ACGIH TLV for Manual Lifting, etc.), and the like. The memory 18 may be any suitable type of storage device including, but not limited to, RAM, ROM, EPROM, flash memory, a hard drive, and/or the like. In some cases, the processor 16 may store information within the memory 18, and may subsequently retrieve the stored information from the memory 18.

FIG. 4 depicts a schematic box diagram of a monitoring system 10 having an image capturing device 12 connected to a remote server 34 (e.g., a web server or other server) through a network 36. When so configured, the image capturing device 12 may send recorded video to the remote server 34 over the network 36 for processing. Alternatively, or in addition, the image capturing device 12 and/or an intermediary device (not necessarily shown) between the image capturing device 12 and the remote server 34 may process a portion of the video and send the partially processed video to the remote server 34 for further processing and/or analyses. The remote server 34 may process the video and send the processed video and/or results of the processing of the video (e.g., a risk assessment, RWL, LI, etc.) back to the image capturing device, send the results to other electronic devices, save the results, and/or perform one or more other actions.

The remote server 34 may be any suitable computing device configured to process and/or analyze video and communicate with a remote device (e.g., the image capturing device 12 or other remote device). In some cases, the remote server 34 may have more processing power than the image capturing device 12 and thus, may be more suitable for analyzing the video recorded by the image capturing device, but this is not always the case.

The network 36 may include a single network or multiple networks to facilitate communication among devices connected to the network 36. For example, the network 36 may include a wired network, a wireless local area network (LAN), a wide area network (WAN) (e.g., the Internet), and/or one or more other networks. In some cases, to communicate on the wireless LAN, the output port 22 may include a wireless access point and/or a network host device and in other cases, the output port 22 may communicate with a wireless access point and/or a network access point that is separate from the output port 22 and/or the image capturing device 12. Further, the wireless LAN may include a local domain name server (DNS), but this is not required for all embodiments. In some cases, the wireless LAN may be an ad hoc wireless network, but this is not required.

Figure 5:
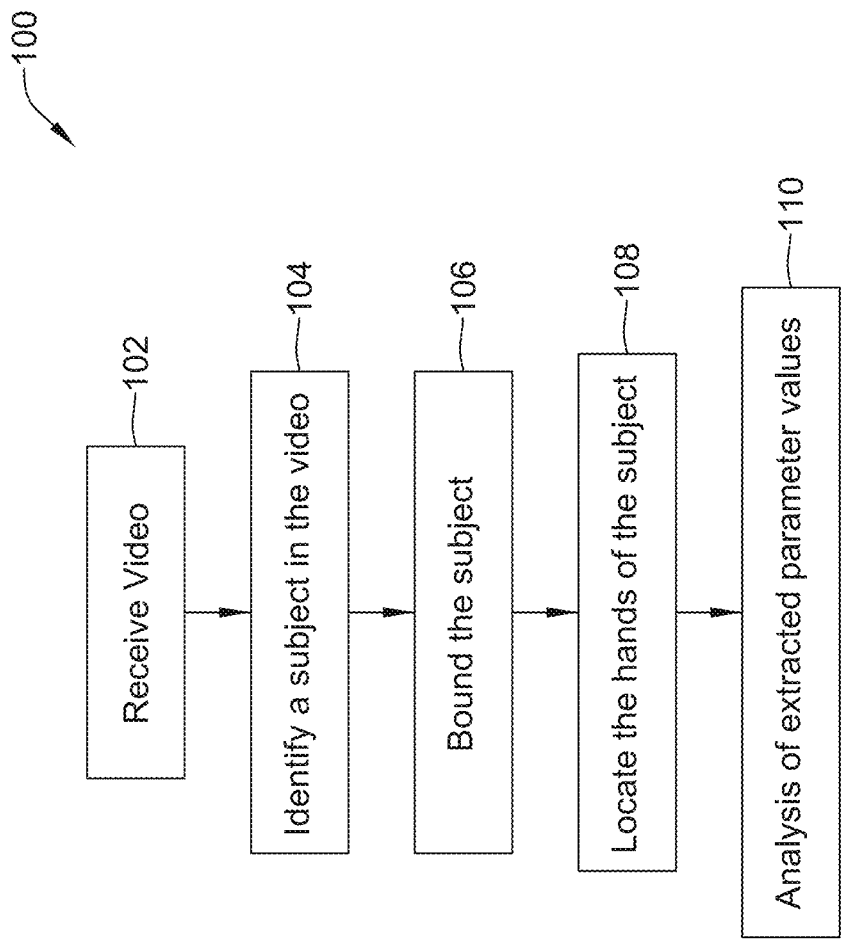
FIG. 5 is a schematic flow diagram of an illustrative method of monitoring movement of a subject.

FIG. 5 depicts a schematic overview of an approach 100 for identifying and analyzing movement of a subject (e.g., the subject 2 or other suitable subject) in video without the use of sensors or continuous tracking of limbs of a subject via linkage algorithms. The approach 100 may include receiving 102 video from an image capturing source (e.g., the image capturing device 12 or other source) and identifying 104 the subject in the video. Once the subject is identified 104, the subject may be bound 106 and the hands of the subject may be located 108. After locating 108 the hands of the subject, parameters values extracted from the video by identifying the subject, a bound of the subject, a location of the hands, and/or other parameters may be analyzed 110 to determine a position of the subject (e.g., a lifting state or other state of the subject). Additionally or alternatively, parameter values extracted from the video by identifying joint locations or locations of other features of the subject may be analyzed 110 to determine a position (e.g., a twisting position/angle, asymmetry angle, etc.) of the subject. In some cases, the analyses may include using the obtained parameter values in the NIOSH Lifting Equation, the ACGIH TLVs for Manual Lifting, and/or other movement analyses equations to evaluate risk of injury to the subject while performing a task recorded in the video, but the obtained parameter values may be analyzed for one or more other purposes.

Identifying 104 the subject in received video may be accomplished in one or more manners. For example, the subject may be identified 104 in received video by manually identifying the subject and/or by identifying the subject in an automated or at least partially automated manner (e.g., automatically and/or in response to a manual initiation). A subject may be manually identified by manually outlining the subject, by applying a shape (e.g., a box or other shape) around the subject, by clicking on the subject, and/or manually identifying the subject in one or more other manners. Background subtraction or other suitable techniques may be utilized to automatically identify or identify in an automated manner a contour of the subject (e.g., a foreground). Other suitable manual techniques and/or automated techniques may be utilized to identify a subject in received video.

Background subtraction may be performed in one or more manners. In general, background subtraction may be performed by statistically estimating whether a pixel in the current frame of video (e.g., each pixel or a set of pixels in the current frame) belongs to the background or the foreground depicted in the frame. To facilitate statistically estimating whether a pixel belongs to the background or the foreground depicted in a frame, each pixel or set of pixels may be given a value based on a feature (e.g., color, shading, intensity, etc.) of the pixel. Here, an underlying assumption is that values of a background pixel in a video will change slowly over time (e.g., background pixels may be expected to remain unchanged for at least a plurality of consecutive frames of video) compared to values of a foreground pixel (e.g., foreground pixels, especially those on or around a periphery of a subject, may be expected to change from frame-to-frame in video and/or at least more rapidly than background pixels). As a result, values of a pixel over a fixed window of a past set of frames can be used to estimate the pixel value at the current frame (e.g., in some cases, the estimated pixel value may be considered an expected pixel value). If the prediction is sufficiently accurate with respect to an actual pixel value at the current frame, this pixel is likely to be and/or may be considered to be a background pixel. Otherwise, this pixel is likely to be and/or may be considered to be a foreground pixel. Alternatively or in addition, an estimated pixel value may be indicative of a foreground pixel and if the prediction is sufficiently accurate with respect to an actual pixel value at the current frame, the pixel is likely to be and/or may be considered to be a foreground pixel. Otherwise, the pixel is likely to be and/or may be considered to be a background pixel.

As used herein, a pixel may be a smallest addressable element in an image or display device. Each pixel used to depict a frame of video may have an address or physical coordinates in a two-dimensional grid in the frame.

One may model the values of a pixel over a fixed number of past video frames using a Mixture of Gaussian (MOG) model and update the model parameters adaptively as the algorithm progresses over time to provide estimates of pixel values and determine if a pixel belongs to the background or the foreground. An example MOG approach is described in Zivkovic, Zoran. "Improved adaptive Gaussian mixture model for background subtraction." Pattern Recognition, 2004, ICPR 2004, Proceedings of the 17th International Conference on. Vol. 2. IEEE, 2004, which is hereby incorporated by reference in its entirety. Another example MOG approach is described in Zivkovic, Zoran, and Ferdinand Van Der Heijden. "Efficient adaptive density estimation per image pixel for the task of background subtraction." Pattern recognition letters 27.7 (2006): 773-780, which is hereby incorporated by reference in its entirety. Additionally, or alternatively, other modeling techniques and/or segmentation approaches may be utilized to differentiate between a background and a foreground.

The background subtraction and/or other video processing discussed herein may be done on color video, gray-scale video, black and white video, and/or other video. In some cases, a color video may be converted to gray-scale to facilitate separating out the background from the subject, but this is not required. Using gray-scale video may reduce processing power needed to separate the background from the subject as only one channel is required to be processed by comparing corresponding pixels, whereas a color video may typically have three channels (a red channel, a green channel, and a blue channel) for which corresponding pixels may need to be compared to possible pixel values based on a distribution (as discussed below).

Figure 6A:
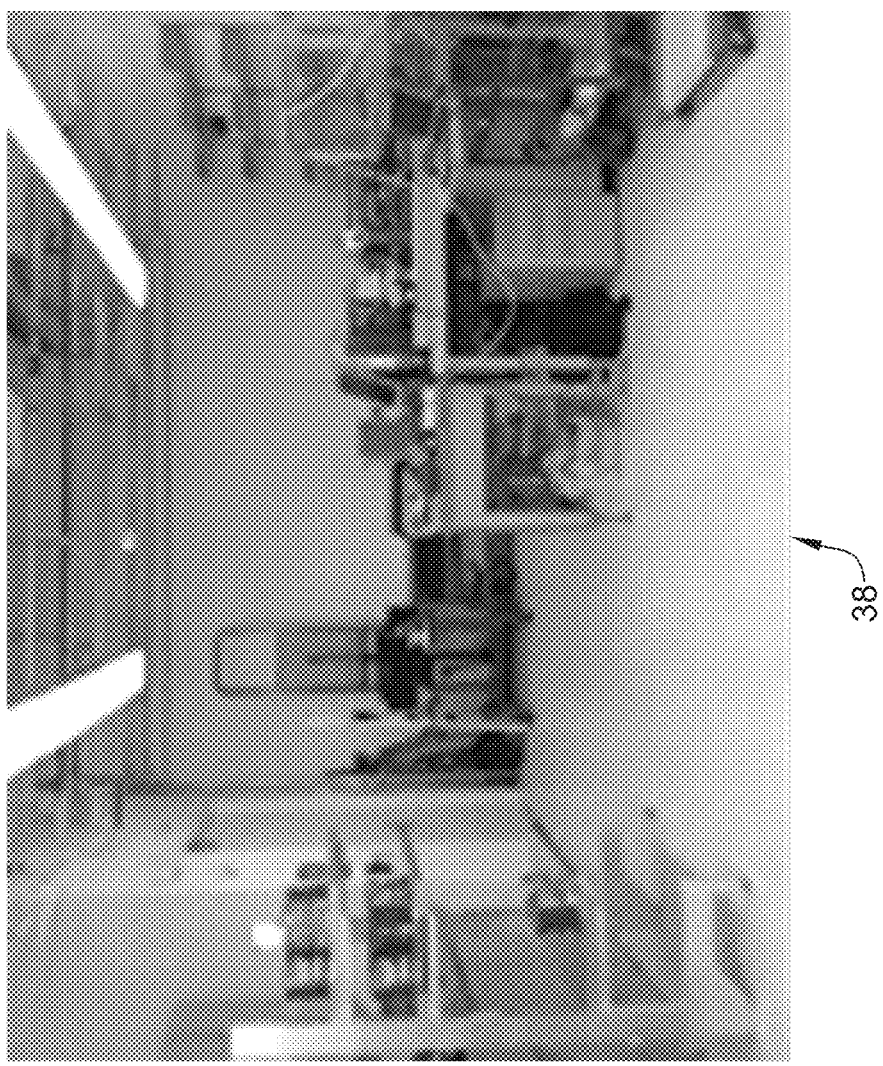
FIG. 6A is an illustrative frame of video used as a reference frame in a monitoring system.
Figure 6B:
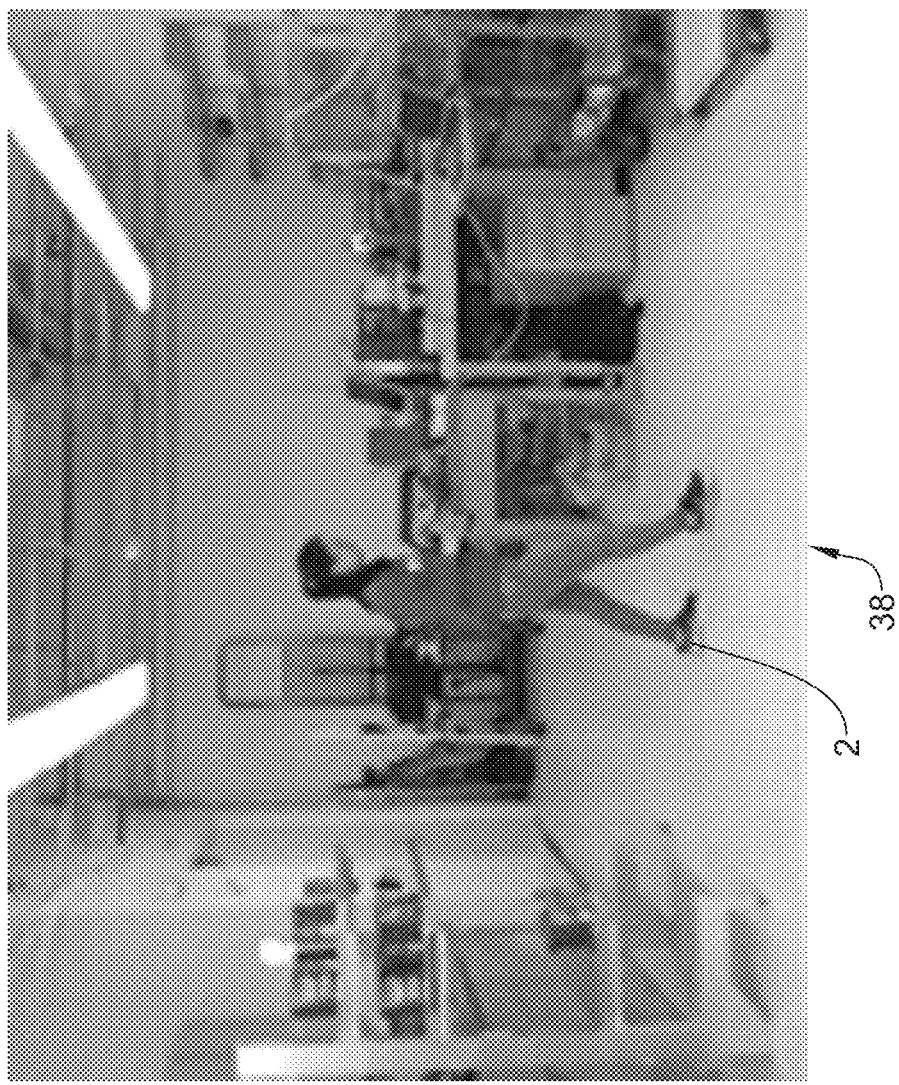
FIG. 6B is an illustrative frame of video that may be compared to the reference frame in FIG. 6A by the monitoring system.

FIGS. 6A and 6B depict frames of a video. In FIG. 6A, a frame having a background 38 is depicted without a subject 2. FIG. 6B is a frame having the subject 2 with the background 38 of or substantially similar to the background 38 in FIG. 6A. One of the frame in FIG. 6A and the frame in FIG. 6B may be considered a reference frame and pixels of the other frame may be compared to corresponding possible pixel values from a distribution developed based on at least the reference frame and each pixel in the other frame may be assigned an indicator of being background or foreground (e.g., a number value, a color (e.g., black or white), etc.) using the segmentation approaches discussed above.

FIG. 7 depicts a foreground subtraction resulting from segmenting FIG. 6B relative to FIG. 6A. As this may be the beginning of the video, the background may change and the possible background pixel value Gaussian distribution mixture model (e.g., the MOG model or other model) may be of only one distribution component with a mean value of the distribution being the same as the pixel values in FIG. 6A. The appearance of the moving subject in FIG. 6B may not be matched into the corresponding background model and as a result, the pixels of the moving subject may be considered the foreground (e.g., as represented in white as a silhouette 40) and the rest of the pixels may be considered the background (e.g., as represented in black). Although the segmentation is depicted in FIG. 7 with the background being black and the foreground being white, other colors or techniques (e.g., outlining, etc.) may be used to distinguish between a foreground and a background. Alternatively, segmentation may not be depicted and a display may depict the original video during and/or after processing of the video or no video at all.

Although the background in the frames of FIG. 6A and FIG. 6B is static or substantially static, the background subtraction techniques described above may be utilized on dynamically changing backgrounds. In such cases, an initialization of the subject 2 may be done to distinguish the moving subject 2 from other moving objects in the background. Such initialization may be accomplished by manually or automatically applying a bounding box (e.g., as discussed below) to or around the subject 2 and/or may be accomplished in one or more other manners. After the initialization of the subject 2, any objects identified as moving (e.g., through identifying a ghost effect blob) between frames may be compared to the initialized subject 2 in a previous frame and only moving objects matching the initialized subject 2 in the previous frame will be kept as foreground or as the subject 2.

In some cases, the monitoring system 10 may not be able to recognize an entirety of the subject 2, which may result in an incomplete silhouette 40 of the subject 2 (e.g., the silhouette 40 may have one or more holes or gaps 42, as shown in FIG. 7) being produced from comparing pixels of successive frames of video. Such holes or gaps 42 may appear due to noise in the environment (e.g., illumination changes, shadows, etc.) around the background 38 and/or due to a pixel representing part of the subject 2 (e.g., one or more pixels in the frame) that may have an appearance (e.g., intensity value) that is close to that of a pixel of the background 38 in a reference frame, such that the pixel value matches the background model. It is contemplated that the holes or gaps 42 may occur in a silhouette for one or more other reasons.

The holes or gaps 42 in a silhouette 40 may be addressed in one or more manners. In one example, the holes or gaps 42 may be filed through morphological and/or other techniques that fill-in gaps between identified portions of the silhouette 40.

Once the subject 2 has been identified in the video by identifying the silhouette 40, the subject 2 may be bound 106. The subject 2 may be bound 106 using one or more manual and/or automated techniques.

In one example of bounding the subject 2, marginal pixels of the silhouette 40 of the subject 2 in a horizontal direction and in a vertical direction may be identified. That is, an extreme-most pixel of the silhouette 40 in a positive y-direction, an extreme-most pixel of the silhouette 40 in the negative y-direction, an extreme-most pixel of the silhouette 40 in a positive x-direction, and an extreme-most pixel of the silhouette 40 in a negative x-direction may be identified relative to a center of the silhouette 40. A height dimension of the silhouette 40 may be identified by taking a difference of a vertical coordinate location on the grid of the frame for the extreme-most pixel of the silhouette 40 in the positive y-direction and a vertical coordinate location on the grid of the frame for the extreme-most pixel of the silhouette 40 in the negative y-direction. A width dimension of the silhouette 40 may be identified by taking a difference of a horizontal coordinate location on the grid of the frame for the extreme-most pixel of the silhouette 40 in the positive x-direction and a horizontal coordinate location on the grid of the frame for the extreme-most pixel of the silhouette 40 in the negative x-direction. The height dimension and the width dimension of the silhouette 40 may be used as or assigned as a height dimension and width dimension, respectively, of the subject 2.

Figure 8:
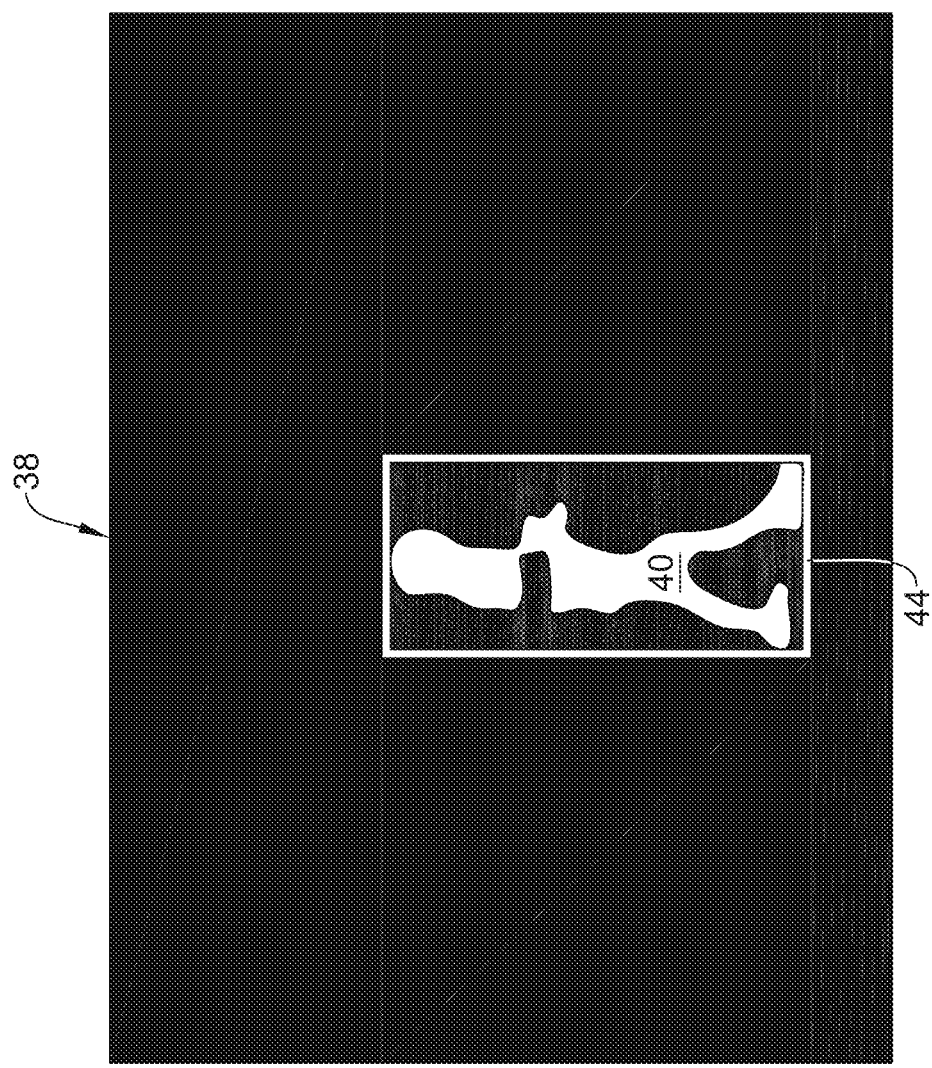
FIG. 8 is a schematic view of an illustrative segmented frame of video with a bounding box applied around an identified subject.

Alternatively, or in addition, the subject 2 may be bound 106 by applying a bounding box 44 around silhouette 40, as shown in FIG. 8. The bounding box 44 may be applied close around the silhouette 40. In some cases, an edge of the bounding box 44 may tangentially pass each of the marginal pixels of the silhouette 40 in a positive y-direction, a negative y-direction, a positive x-direction, and a negative x-direction relative to a center of the silhouette 40. Alternatively or in addition, the bounding box 44 may be applied around the silhouette 40 to bound the subject 2 so as to extend through one or more other pixels of the silhouette 40 and/or the background 38. The height and width dimensions of the bounding box 44 may be equal to or may be indicative of a height dimension and width dimension of the silhouette 40. Similar to as discussed above, the height dimension and/or the width dimension of the bounding box 44 may be used as or assigned as a height dimension and a width dimension, respectively, of the subject 2. Further, in some cases, the height and width dimensions of the bounding box 44 may be indicative of an object 4 location, a hand location of the subject 2, and/or other parameter values.

Figure 9A:
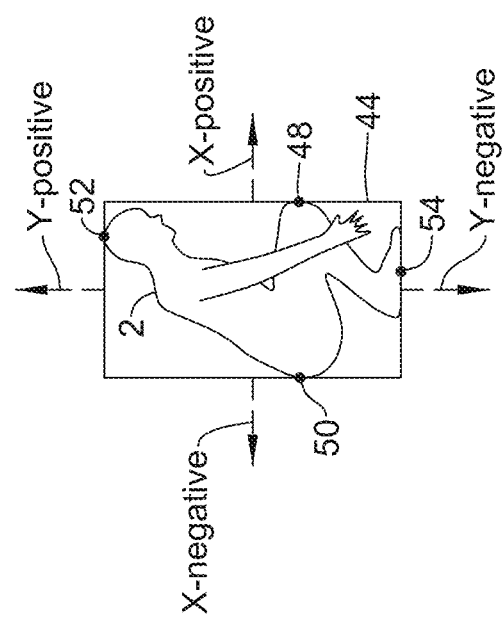
FIGS. 9A-9C depict subjects in different illustrative orientations, where the subjects are bound by a bounding box.
Figure 9B:
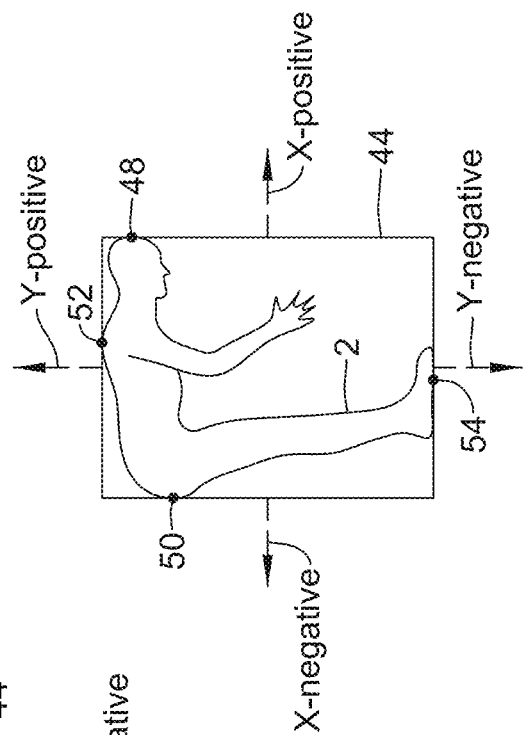
Figure 9C:
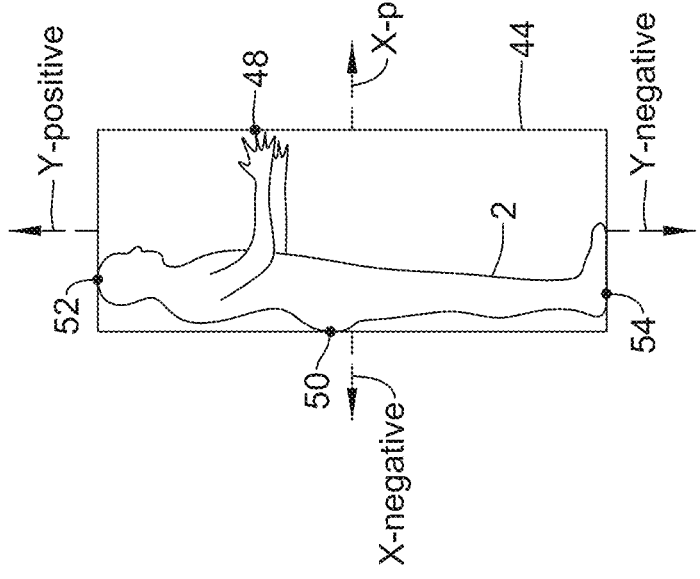

FIGS. 9A-9C depict the subject 2 in three different postures, respectively, with a bounding box 44 and identified locations of marginal pixels. In FIG. 9A, the subject 2 is in a standing position or posture, in FIG. 9B the subject 2 is in a stooping position or posture, and in FIG. 9C the subject 2 is in a squatting position or posture. Each of FIG. 9A, FIG. 9B, and FIG. 9C depict a coordinate system 46 relative to a center of a height and width of the subject 2. The coordinate system 46 is depicted for descriptive (e.g., relational) purposes only and is not necessarily part of the monitoring system 10. Further, FIGS. 9A-9C depict a marginal pixel 48 in the x-positive direction, a marginal pixel 50 in the x-negative direction, a marginal pixel 52 in the y-positive direction, and a marginal pixel 54 in the y-negative direction. Then, optionally, the bounding box 44 may be applied around the subject 2 (or the silhouette 40 of the subject 2) tangential to or otherwise relative to the marginal pixels 48, 50, 52, 54.

As can be seen from FIGS. 9A-9C, each of the respective orientations or postures of the subject 2 correspond to a different height and width dimension of the subject 2 or bounding box 44. It has been found that a height and a width of a subject 2 or bounding box 44 correlates with an orientation (e.g., posture or other orientation) of the subject 2 and/or other parameters relative to the subject 2. As such, in a lifting analysis, the height and width dimension of the subject 2 or the bounding box 44 may be utilized to determine or predict at least the orientation of and/or the posture of the subject 2 and to determine injury risks for the subject without complex linkage algorithms, sensors and sensor data, and manual measurements (e.g., hip and/or knee angles, etc.).

Figure 10:
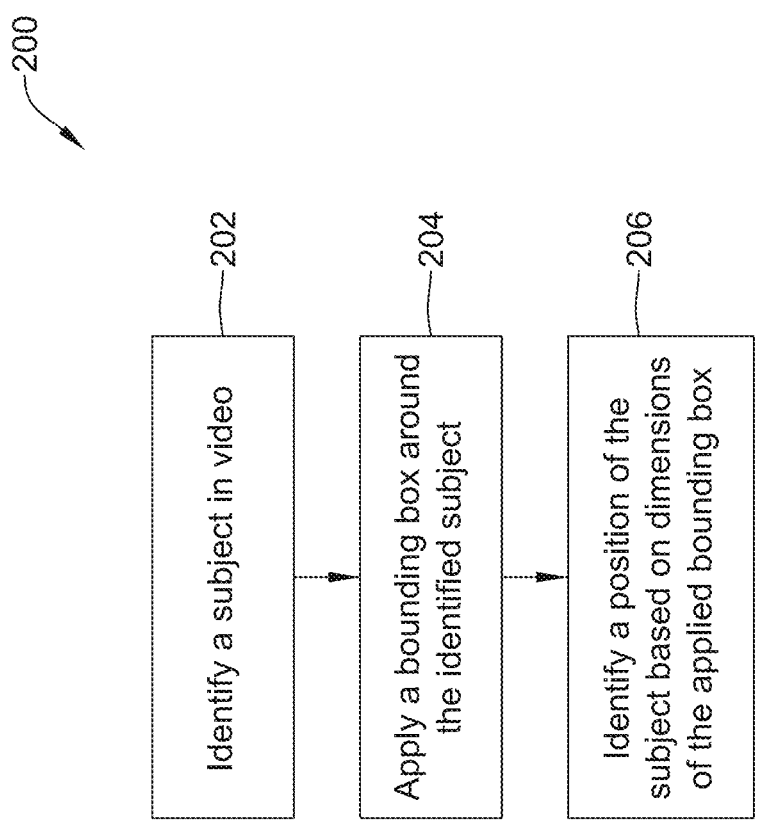
FIG. 10 is a schematic flow diagram of an illustrative method of identifying a parameter of a subject.

FIG. 10 is a flow diagram of an approach 200 for determining an orientation of a subject (e.g., the subject 2 or other suitable subject). The approach 200 may include identifying 202 a subject in video. The subject may be identified in a manner similar to as discussed above with respect to the step 104 of the approach 100 and/or in one or more other manners.

Once the subject has been identified, a bound may be applied 204 to and/or around the identified subject. The bound may be a bounding box (e.g., the bounding box 44) and may be applied in a manner similar to as discussed above with respect to the step 106 of the approach 100. In some cases, the identified subject may be bound in one or more other manners including, but not limited to, identifying marginal pixels of the identified subject in a horizontal direction and in a vertical direction without defining a bounding box.

When the subject has been bound, dimensions (e.g., height and width dimensions in pixels or other units and/or other suitable dimensions) of the subject in a frame of video may be determined from the dimensions of the bound of the subject (e.g., dimensions of the bounding box and/or dimensions from differencing the marginal pixels in the vertical direction and differencing the marginal pixels in the horizontal direction). In one example, the height and width dimensions of the bound of the subject may be directly assigned as the height and width dimensions of the subject. Alternatively or in addition, the height and width dimensions of the subject may be determined from or assigned based on one or more different functions of the dimensions of the bound of the subject. Based, at least in part, on the height and width dimensions of the identified subject that are obtained from bounding the subject or are obtained in one or more other suitable manners, a parameter of the subject may be identified 206 (e.g., a posture, orientation, and/or one or more other suitable parameters of the subject may be predicted). Thus, as discussed above, parameter information may be extracted and/or predicted from video without the use of complex linkage models used in some motion tracking techniques and without taking complex measurements of angles of portions of the subject relative to other portions of the subject.

In some cases, a posture of the subject may be determined from the subject's identified and/or assigned dimensions based on one or more of the dimensions of the bound in one or more suitable manners. In one example, the posture of the subject may be determined based on the subject's determined height dimension and the subject's determined width dimension, but other dimensions of the subject may be additionally and/or alternatively used. In some cases, the posture and/or other parameter of the subject may be determined in real time (e.g., in real time during recording of video and/or during playback of video).

When determining the subject's posture based on the subject's identified or assigned height dimension and width dimension, the height and width dimensions of the subject may be normalized. In one example, the height and width dimensions of the subject may be normalized based on a standing height of the subject (e.g., a normalizer) to obtain a normalized height of the subject and a normalized width of the subject. Normalizing the height of the subject and the width of the subject may include dividing the height of the subject by the normalizer and dividing the width of the subject by the normalizer. Alternatively or in addition, the height and the width dimensions of the subject may be normalized in one or more other suitable manners. Normalizing the dimensions of the subjects analyzed in video may facilitate accounting for varying anthropologies among the subjects having their movements analyzed.

Although other postures of the subject may be identified, a standing posture, a stooping posture, and a squatting posture (e.g., see FIG. 9A-9C for depictions of these postures) may be a focus of posture analysis due to the relevance of these postures in the NIOSH lifting equation and/or the ACGIH TLV for manual lifting, among other analyses. Generally, whether a person (e.g., the subject) is in a standing posture, a stooping posture, or a squatting posture may be determined from a knee bend angle and trunk bend angle. In one example, when the person has a knee bend angle that has not reached or gone beyond (e.g., is less than) one hundred thirty (130) degrees, the person may be considered to be in a squatting posture. When the person has a knee bend angle that has reached or gone beyond (e.g., is equal to or greater than) one hundred thirty (130) degrees and a trunk bend angle (e.g., a hip bend angle) that has reached or gone beyond forty (40) degrees, the person may be considered to be in a stooping posture. When the person has a knee bend angle that has reached or gone beyond one hundred thirty (130) degrees and a trunk bend angle that has not reached or gone beyond forty (40) degrees, the person may be considered to be in a standing position. As discussed above, however, it may be difficult to track bending angles of a subject in video due to such tracking requiring sensors, manual identification, and/or complex limb tracking algorithms and as a result, it may be difficult to determine postures of monitored subjects in frames of video.

As referred to above, an additional or alternative technique for identifying standing, stopping, and squatting postures of a subject in frames of video that does not require tracking of bending angles of a subject in video, use of sensors, use of manual identification, or use of complex limb tracking algorithms may include determining these postures based on one or both of the subject's height and width dimensions. In some cases, a value based on the height dimension of the subject and a value based on the width dimension of the subject (e.g., the height and width dimensions of the subject, normalized height and width dimensions of the subject, and/or other values based on the height and width dimensions of the subject) may be compared to one or more height thresholds and one or more width thresholds, respectively, to determine the subject's posture.

Figure 11:
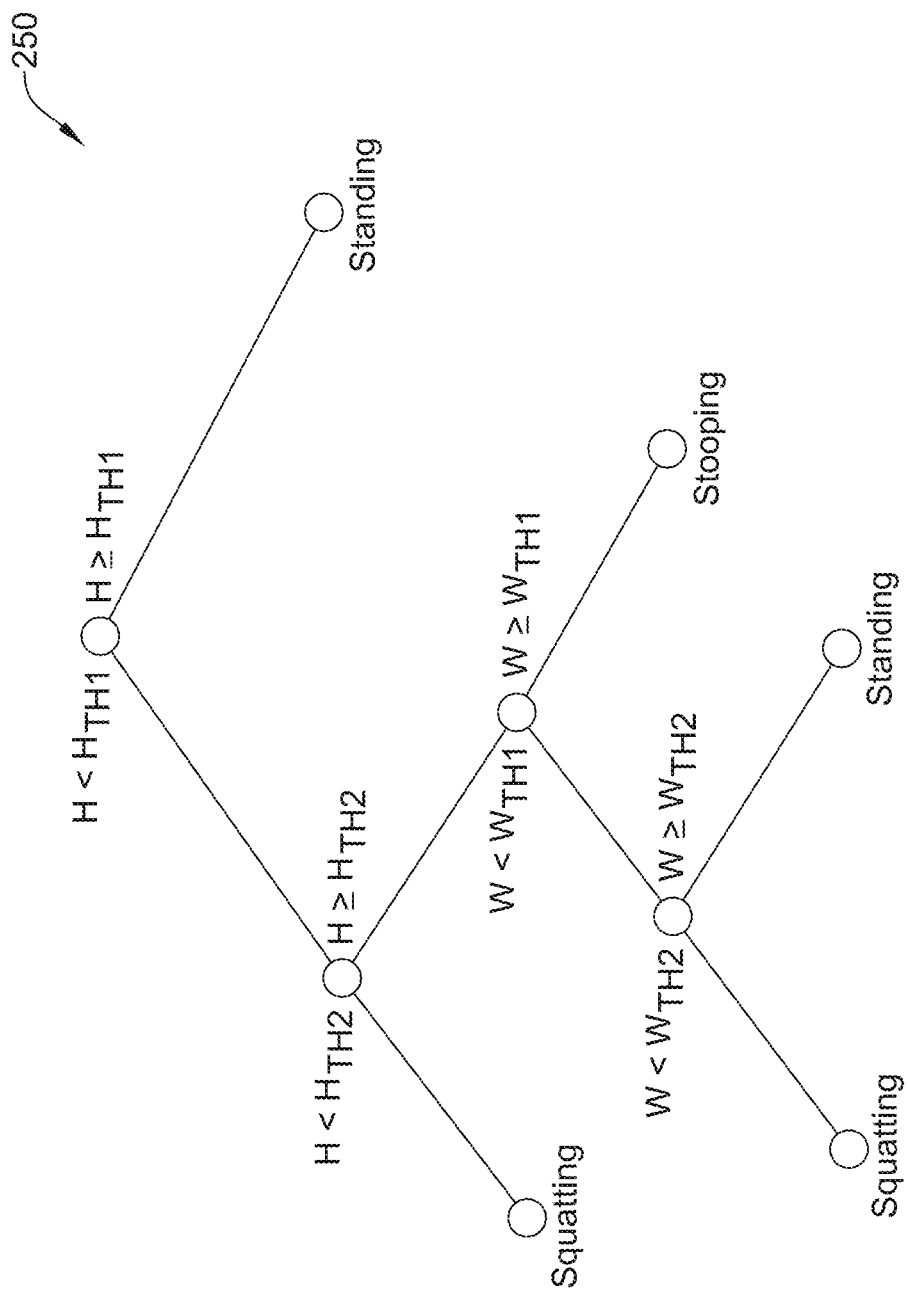
FIG. 11 is a schematic diagram of an illustrative decision tree technique for comparing values to thresholds.

When determining whether a subject in a frame of video is in a standing posture, a stooping posture, or a squatting posture, the value based on the height of the subject may be compared to a first height threshold and a second height threshold and the value based on a width of the subject may be compared to a first width threshold and a second width threshold. The values based on the dimensions of the subject may be compared to thresholds using one or more suitable techniques and in one or more suitable orders. In some cases, a technique using a decision tree 250, as shown in FIG. 11 for example, may be utilized. Additional or alternative techniques for comparing the values based on the dimensions of the subject to thresholds may include, but are not limited to, look up tables, algebraic equations, and/or other suitable techniques.

In an example using a decision tree, such as when the decision tree 250 is utilized, an analysis may start at a top of the decision tree 250 and initially the value based on the height of the subject may be compared to the first height threshold $H_{TH1}$. When the value based on the height of the subject has reached or gone beyond (e.g., is equal to or greater than) the first height threshold $H_{TH1}$, the subject may be classified as being in and/or may be assigned a standing posture. When the value based on the height of the subject has not reached or gone beyond the first height threshold Elm, then the value based on the height of the subject may be compared to the second height threshold $H_{TH2}$. When the value based on the height of the subject has not reached or gone beyond (e.g., is less than) the second height threshold $H_{TH2}$, the subject may be classified as being in and/or may be assigned a squatting posture. When the value based on the height of the subject has not reached or gone beyond the first height threshold Elm and has reached or gone beyond the second height threshold $H_{TH2}$, a value based on the width of the subject may be compared to the first width threshold Wan. When the value based on the width of the subject has reached or gone beyond the first width threshold $W_{TH1}$, the subject may be classified as being in and/or may be assigned a stooping posture. When the value based on the height of the subject has not reached or gone beyond the first height threshold Elm and has reached or gone beyond the second height threshold $H_{TH2}$ and the value based on the width of the subject to has not reached or gone beyond the first width threshold Wan, the value based on the width of the subject may be compared to the second width threshold $W_{TH2}$. When the value based on the width of the subject has reached or gone beyond the second width threshold $W_{TH2}$, the subject may be classified as being in and/or may be assigned a standing position. When the value based on the width of the subject has not reached or gone beyond the second width threshold $W_{TH2}$, the subject may be classified as being in and/or may be assigned a squatting position. Using a decision tree technique for comparing values based dimensions to dimension threshold values may result in an efficient determination of posture information for a monitored subject.

Values of the threshold values related to height and width of the subject may be suitable values related to a type of value that is used for the values based on the height and width dimensions of the subject. For example, when the values based on the height and width dimensions are normalized using a normalizer of a standing height of a subject in the example above, the first height threshold $H_{TH1}$ may be a value in a range from about 0.90 to about 0.95, the second height threshold $H_{TH2}$ may be a value in a range from about 0.63 to about 0.68, the first width threshold Wan may be a value in a range from about 0.64 to about 0.69, and the second width threshold $W_{TH2}$ may be a value in a range from about 0.51 to about 0.57. In one example, the first height threshold $H_{TH1}$ may be a about 0.93, the second height threshold $H_{TH2}$ may be about 0.66, the first width threshold Wan may be about 0.67, and the second width threshold $W_{TH2}$ may be about 0.54. Other values for thresholds used in determining a posture of a subject are contemplated.

In addition to or as an alternative to being able to extract posture information and/or other information from video to assess injury risk or for another purpose, it may be useful to be able to locate 108 the hands of the subject, particularly at a beginning of a task (e.g., when the subject is in a loading state) and at an ending of the task (e.g., when the subject is in an unloading state). Hand location may be determined in any manner. In some cases, the hands of the subject may be initialized, recognized, and/or tracked manually or by software (e.g., in an automated manner), however, these techniques may require the training of a continuous hand detector and may result in error because the hand of a subject is small (e.g., 20×10 pixels in video) and difficult to differentiate from other portions of the subject. Moreover, tracking of the hand through each frame of video may require more processing power than it is desirable to devote to tracking the hands.

As hand location at the beginning and ending of a task may be useful information for an assessment of the subject 2 performing the task, a technique has been developed to identify the hands of the subject during frames when a task starts and when a task ends without necessarily searching for and tracking the hand through all or substantially all frames of the video and without specifically identifying the hands. In some cases, such a technique may utilize identifying "ghost effects" when the subject 2 loads and/or unloads the object 4.

A ghost effect may be a set of connected and/or adjacent points (e.g., a set of pixels in a frame) detected as being in motion, but not corresponding to any real moving objects. Such a definition of "ghost effects" is discussed in Shoushtarian, B. and Bez, H. "A practical adaptive approach for dynamic background subtraction using an invariant colour model and object tracking." Pattern Recognition Letters, January 2005, 26(1):5-26, January 2005, which is hereby incorporated by reference in its entirety. For example, a ghost effect may be a cluster of pixels that represents an appearance of a static object or a region of a scene where these pixels look different in a current frame than in one or more immediately previous frames. The ghost effect may appear and then disappear into background after the background model learns and updates the new appearance of these pixels over a plurality of frames.

As such, in some cases, the ghost effects may be considered to be a by-product of the background subtraction technique discussed above and may be utilized to identify when a task begins and/or ends, along with a location of the hands of the subject when the task begins and/or ends. For example, as the background subtraction technique may update the background model (e.g., the Gaussian distribution background model, MOG) over two or more frames to adapt for backgrounds that are not static, it may take several frames for a moving object 4 to be considered background after the moving object 4 stops (e.g., becomes static) and/or is separated from the subject 2. Similarly for a static object 4 that starts to move, the location where the object 4 was may take several frames to be considered background. As a result of this delay in recognizing what is background and what is foreground, a location of a moving object 4 after it stops moving (e.g., an ending location) and/or a location of a static object 4 before it begins moving (e.g., a beginning location) may show up as a blob or ghost effect in a frame of video.

One case in which a ghost effect may occur is when a static object is moved and values of pixels at the region where the object was static become different from estimated values of the pixel based on a background model for pixels at the region and thus, that region may be considered to be foreground and/or depicted as such in a frame. The background model may then take several (e.g., two or more) frames to learn the new static appearance of that region and absorb the pixels of that region into the background model. That is, before the background model updates, the pixels of the region where the object was static are labeled as foreground and are considered to depict a ghost effect.

Another case where a ghost effect might occur is when a moving object becomes static. A region where the object stops may change its appearance from a previous appearance when the object was not present (e.g., the background) into an appearance associated with a subject or moving object (e.g., the foreground). As the background model of the region is built up with only pixel values for the previous appearance for when the object was not present in the region, a new presence of the static object in the region may be considered to be foreground. The background model may then take several frames to learn the new static appearance of the region with the newly received object and absorb the pixels of that region into the background model. Before the background model updates, the pixels of the region where the object stopped moving may be labeled as foreground and/or may be considered a ghost effect.

Further and as discussed in greater detail below, the ghost effects 56, as shown for example in FIGS. 12A-12D, 14, and 15, may be detected, and a subject's hand location may be determined from the detected ghost effects 56, by looking for clusters of foreground pixels in a frame of video that were not present in a reference frame or frames of the video. In some cases, ghost effects 56 may be identified when clusters of pixels satisfy certain principles. The principles may include, among other principles, consistency in time (e.g., a cluster of pixels show up in the same location in the following N frames), gradual vanishing (e.g., a size of a cluster should be no larger than a size of the object and may gradually become smaller over a set of frames), the subject 2 is in close proximity to the cluster of pixels when the cluster of pixels are initially identified, and a number of frames it may take for a cluster of pixels to become background is consistent with an expected number of frames for the ghost effect 56 to disappear. To be considered a ghost effect 56, a cluster of pixels may need to satisfy one, some, or all of the above referenced principles and/or other principles.

Figure 12A:
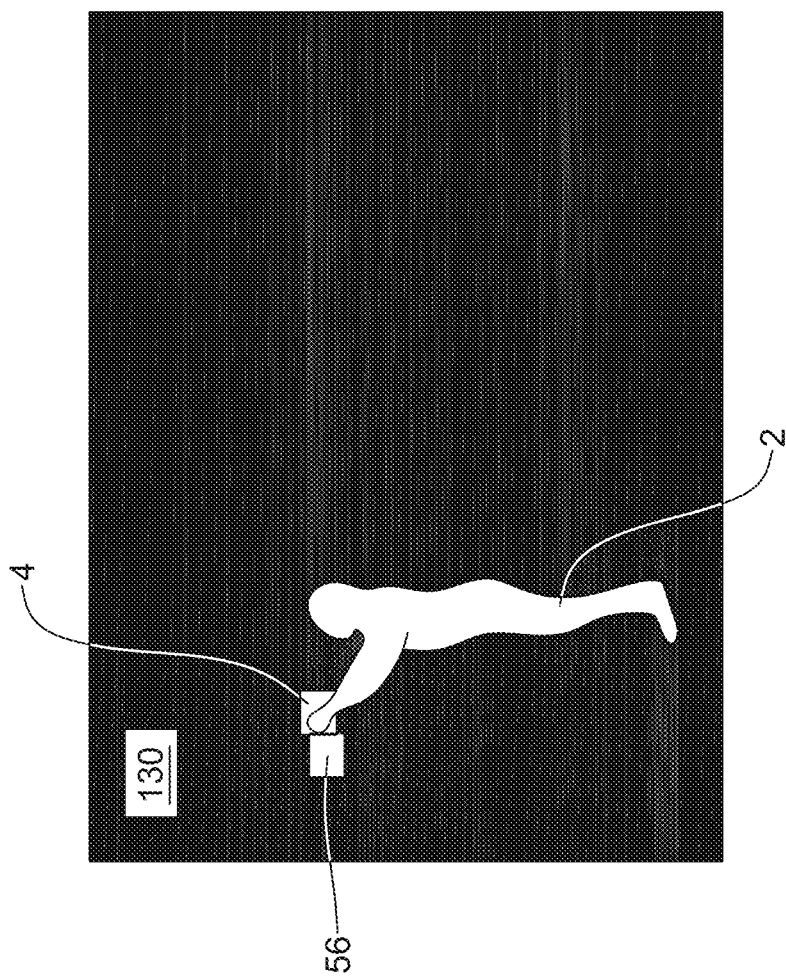
FIGS. 12A-12E are schematic views of illustrative segmented frames of video showing an illustrative ghost effect appearing and disappearing in the frames of video over time.
Figure 12B:
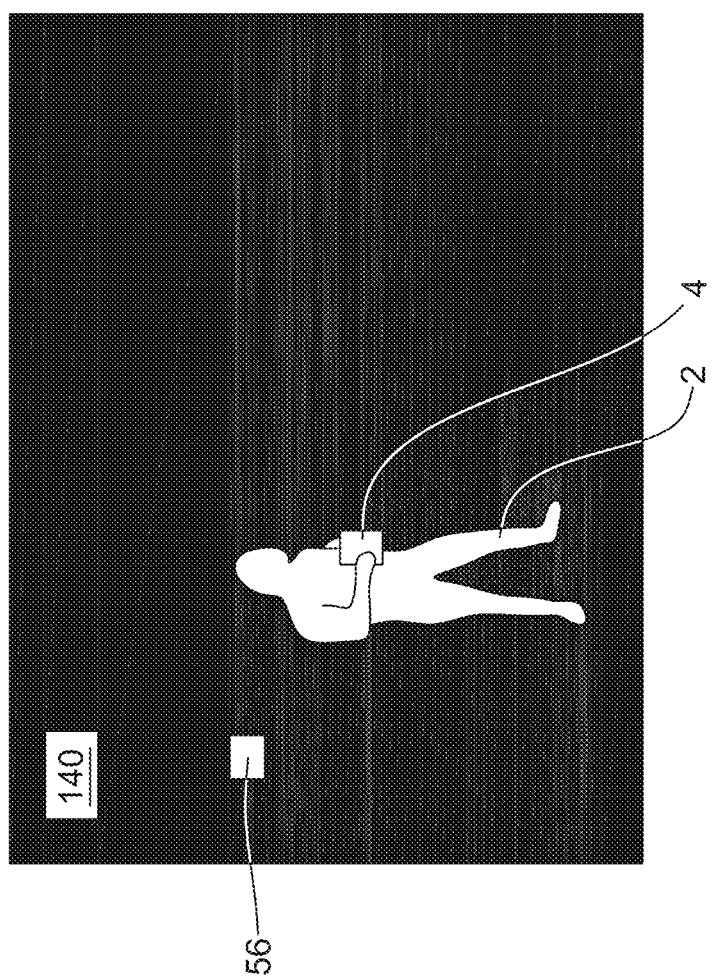
Figure 12C:
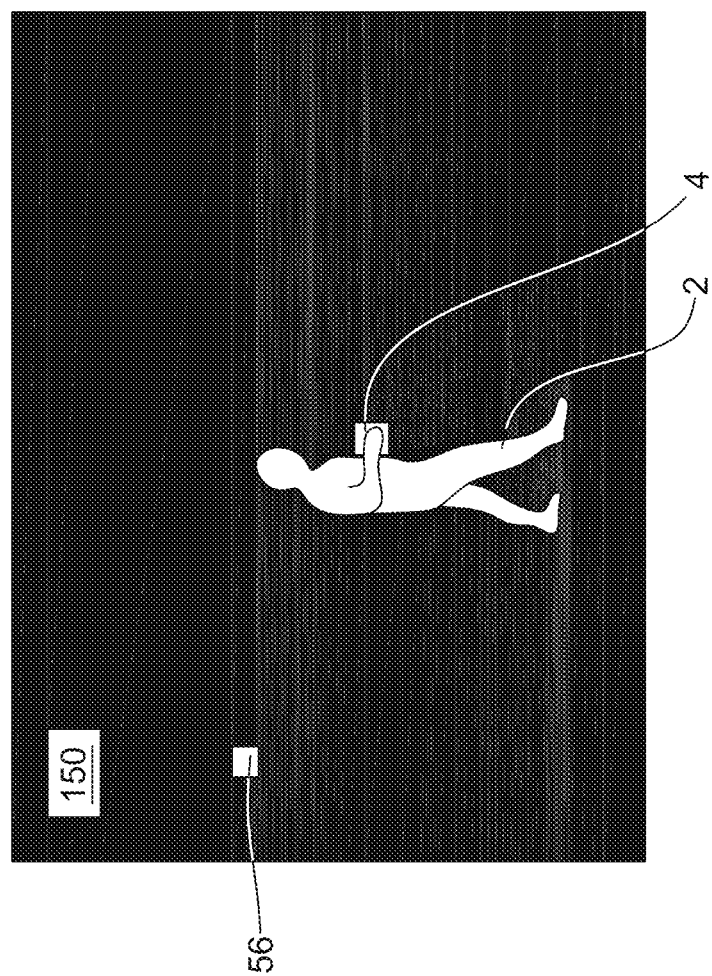
Figure 12D:
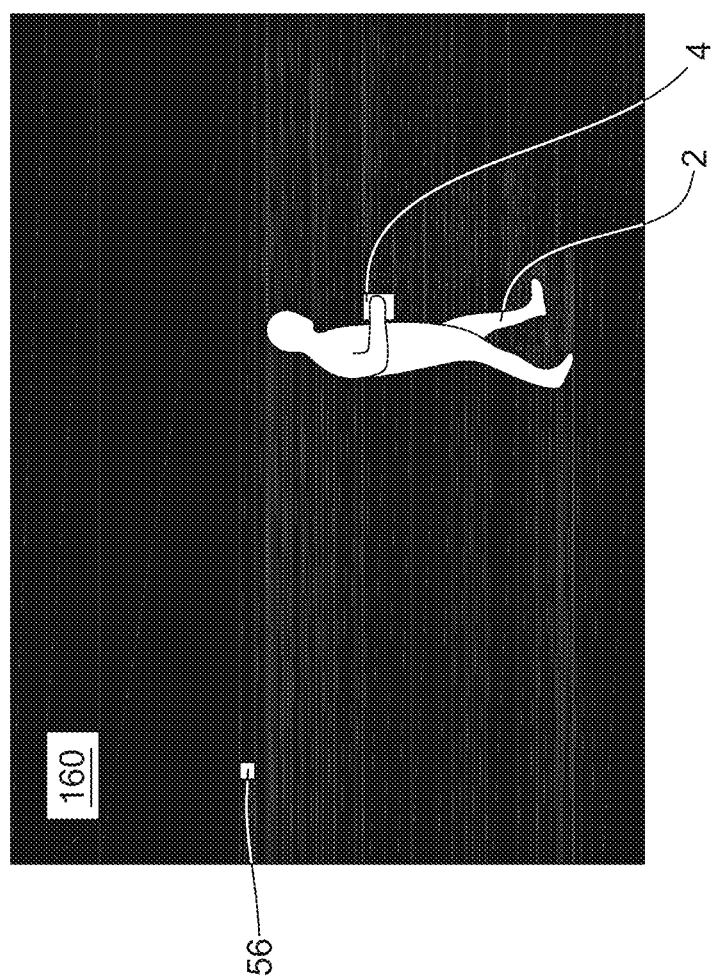
Figure 12E:
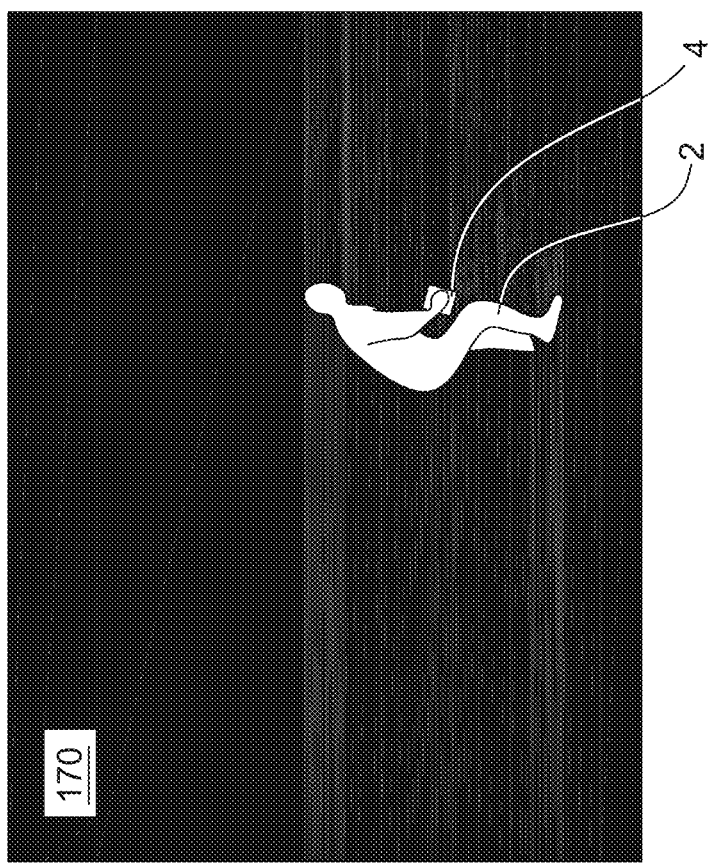

FIGS. 12A-12E depict example frames with the subject 2 and the ghost effect 56 as the ghost effect 56 is first identified and fades away over time. FIG. 12A depicts a frame with the ghost effect 56 near in time to when the ghost effect initially appears and the subject 2 picks up the object 4. Ten (10) frames after the frame of FIG. 12A, the frame of FIG. 12B depicts the ghost effect 56 being separate from the subject 2 and object 4. Ten (10) frames after the frame of FIG. 12B, the frame of FIG. 12C depicts the ghost effect 56 starting to fade into the background. Ten (10) frames after the frame of FIG. 12C, the frame of FIG. 12D depicts the ghost effect 56 almost completely faded into the background. Ten (10) frames after the frame of FIG. 12D, the frame of FIG. 12E no longer depicts the ghost effect 56. Although FIGS. 12A-12E depict the ghost effect 56 completely or substantially disappearing into the background after fifty (50) frames, the ghost effect 56 may be configured to be depicted for a longer or shorter amount of time (e.g., in more or fewer frames).

As a ghost effect 56 may initially occur at a beginning of task (e.g., when an object starts to move) and/or at an end of a task (e.g., when an object first becomes stationary and separated from the subject 2) and a subject's 2 hands may be at the location of a ghost effect to move the object at the beginning of a task and at the location of a ghost effect to place the object at the ending of a task, a hand location of the subject 2 may be determined (e.g., inferred) from a location of the ghost effects 56. A first frame in which a ghost effect 56 is identified (e.g., a first frame in a sequence of frames in which the ghost effect 56 appears) and a position of the ghost effect 56 in the first frame may be a recorded as the time of a beginning or ending of a task and a location of the hands of the subject 2 at that time, respectively.

Although not required, a determination of the frame(s) where the task may start and/or end may be based at least partially on information known about a task. For example, as it may be known that the subject 2 or a portion of the subject 2 performing a repetitive task reverses direction after starting and/or ending the task, a start and an end of a task may be initially identified or confirmed by tracking a horizontal location of the subject in the frames of the video.

The horizontal motion of the subject 2 may be tracked through successive frames in one or more manners and without sensors on the subject 2. In one example, a mass center of the subject or a silhouette 40 of the subject 2 or other feature may be tracked to determine a horizontal location of the subject 2 throughout the video and when the subject 2 reverses direction. In some cases, a median filter or other filter may be applied to the tracking data to more consistently track the subject 2, as ghost effects (described in greater detail below) of objects (e.g., the object 4 or other objects) held by the subject 2 may bias the mass center of the silhouette of the subject in one direction or another.

Figure 13:
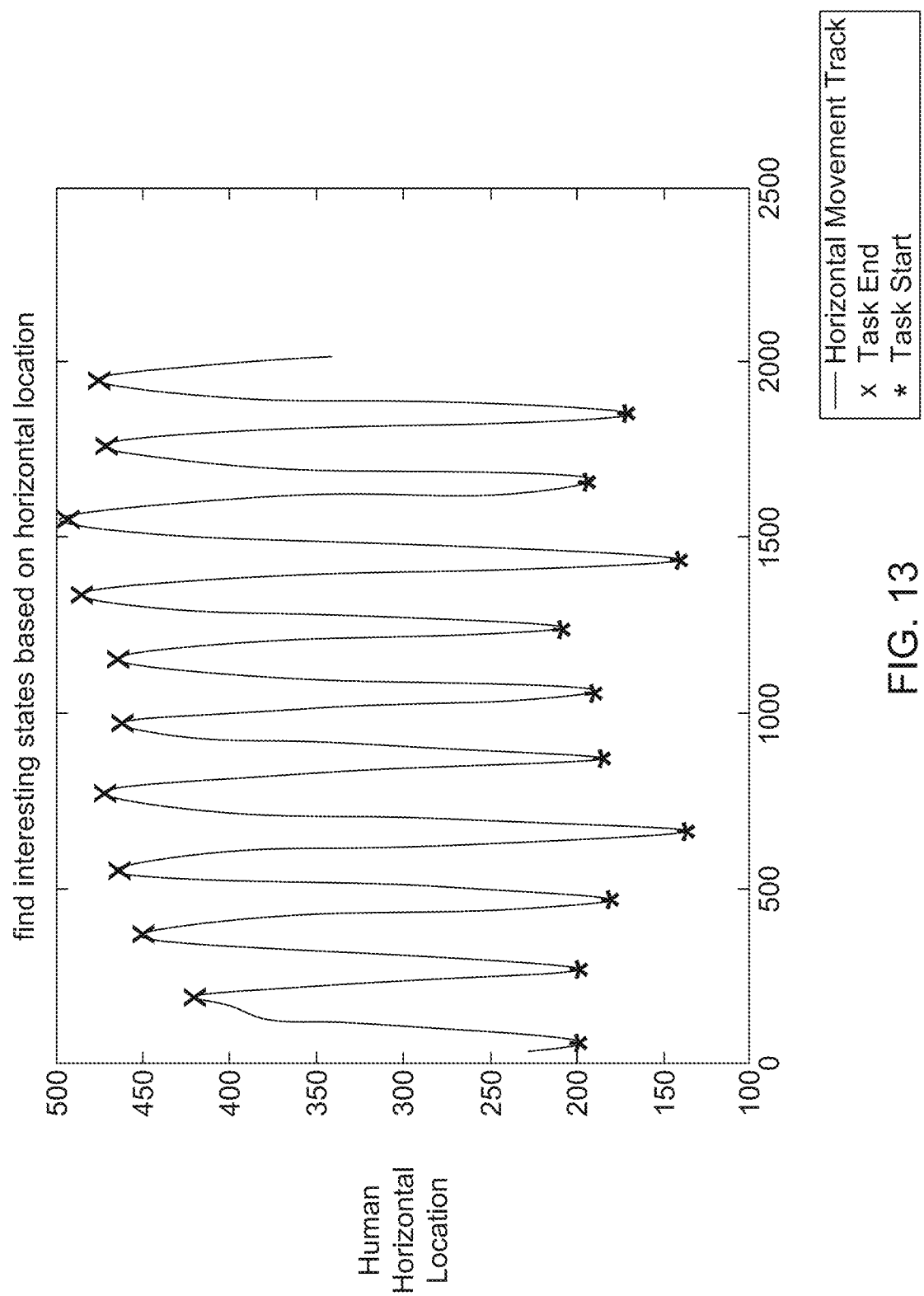
FIG. 13 is a chart depicting illustrative tracked horizontal movement of a subject in video.

FIG. 13 is an illustrative plot of tracked horizontal motion of the silhouette 40 of the subject 2 during a task that is repeated over time. Because the task is repeated, beginning and ending of individual tasks may occur at local extremes. In FIG. 13, a beginning of an individual task may be represented at a first reversal of horizontal movement by a "*" and an ending of an individual task may be represented at a second reversal of horizontal movement by an """". The frame(s) of the video associated with the timing of the "*"

may be the beginning of a task and the frame(s) of the video associated with the timing of the "^" may be the end of the task. Although tracking the horizontal motion of the subject 2 may be utilized to help determine when a beginning of a task or an ending of a task occur, this step is optional.

The monitoring or tracking system 10 may search for an object appearing on a portion of the frame (e.g., the ghost effect 56 of the object 4), which may optionally occur after determining frames around the time a task begins and/or ends, but it is not required to determine or identify frames around when a task begins and/or ends to search for and/or identify an object appearing on a portion of the frame. In some cases, if it is known that a task begins on a left side of a frame of video, the monitoring system 10 may look for the object or ghost effect appearing in the left side of the frame. Similarly, if it is known that a task ends on a right side of the frame, the monitoring system 10 may look for the object or ghost effect to be left in the right side of the frame. If it is not known where in a frame a task is expected to begin and/or end, the monitoring system 10 may look for the object or ghost effect in the entire frame.

Once the locations of the hands of a subject 2 during a beginning and/or an ending of a task are identified, a vertical and/or horizontal distance between the locations of the hands and a location of the feet of the subject 2 may be determined. When the monitoring system 10 is performing a task analysis, such as a lifting analysis, the vertical and horizontal distances between the feet and hands when loading and unloading an object may be necessary to calculate a recommended weight limit and/or may be utilized by the monitoring system to perform other analyses.

Although the monitoring system 10 may determine a hand location as discussed above, a location of the feet within the frame(s) of video may need to be determined. The vertical location of the feet may be considered to be the same as the base of the bounding box (e.g., a margin pixel in the negative y-direction). The horizontal coordinate of the feet location may be determined in one or more manners including, but not limited to, by using a weighted sum of a horizontal silhouette pixel index. The horizontal silhouette pixel index is, for example:

$$FeetCenter_{horizontal} = \frac{\sum_{i=most\ left\ pixel\ index}^{most\ right\ pixel\ index} i \times weight_i}{\sum_{i=most\ left\ pixel\ index}^{most\ right\ pixel\ index} weight_i} \quad (3)$$

The $weight_i$ may be the total number of pixels that is covered by the silhouette 40 at corresponding horizontal index i.

Figure 14:
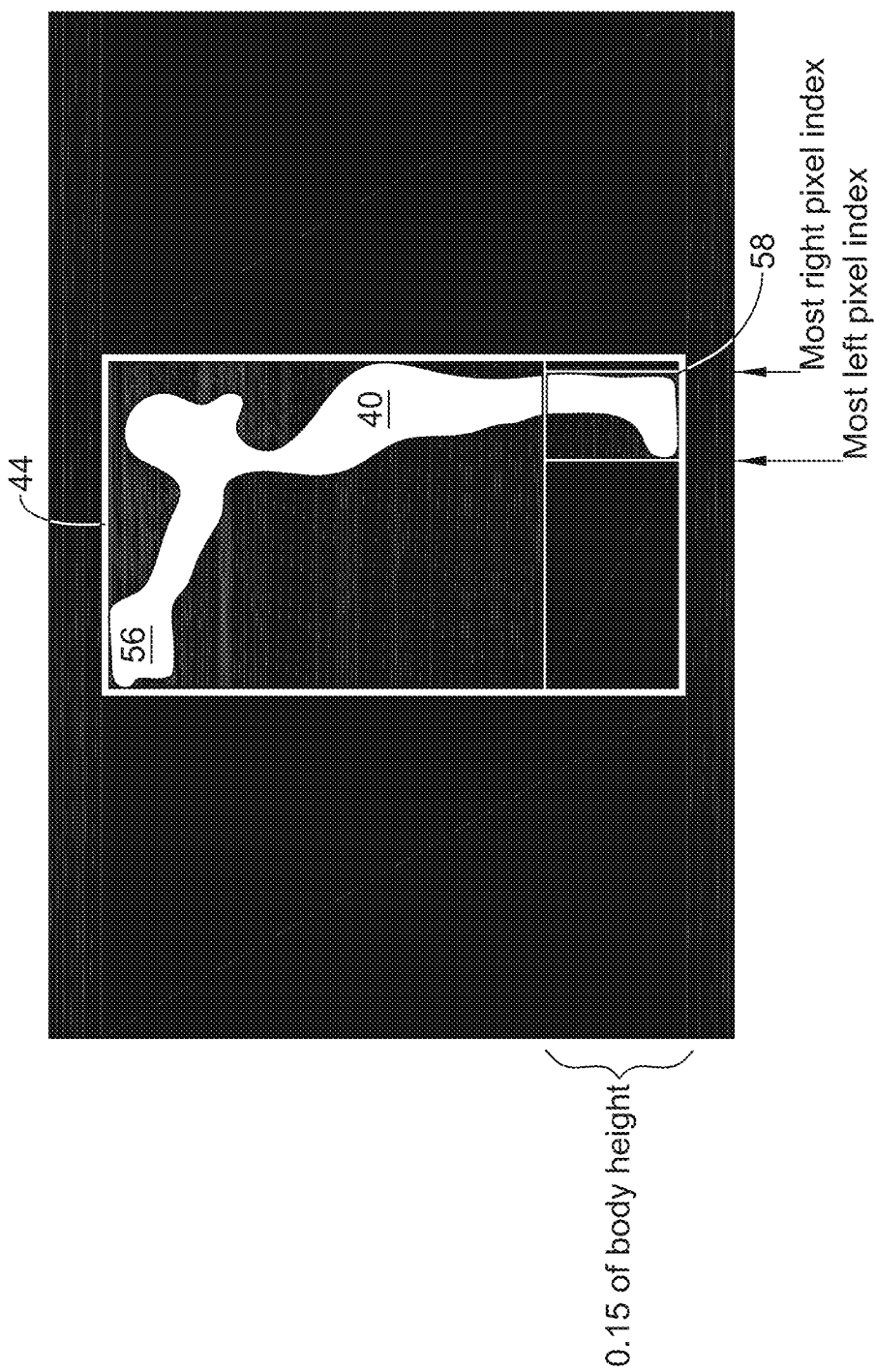
FIG. 14 is a schematic view of an illustrative segmented frame of video depicting a silhouette of a subject loading an object and in which a feet location of the subject is being determined.
Figure 15:
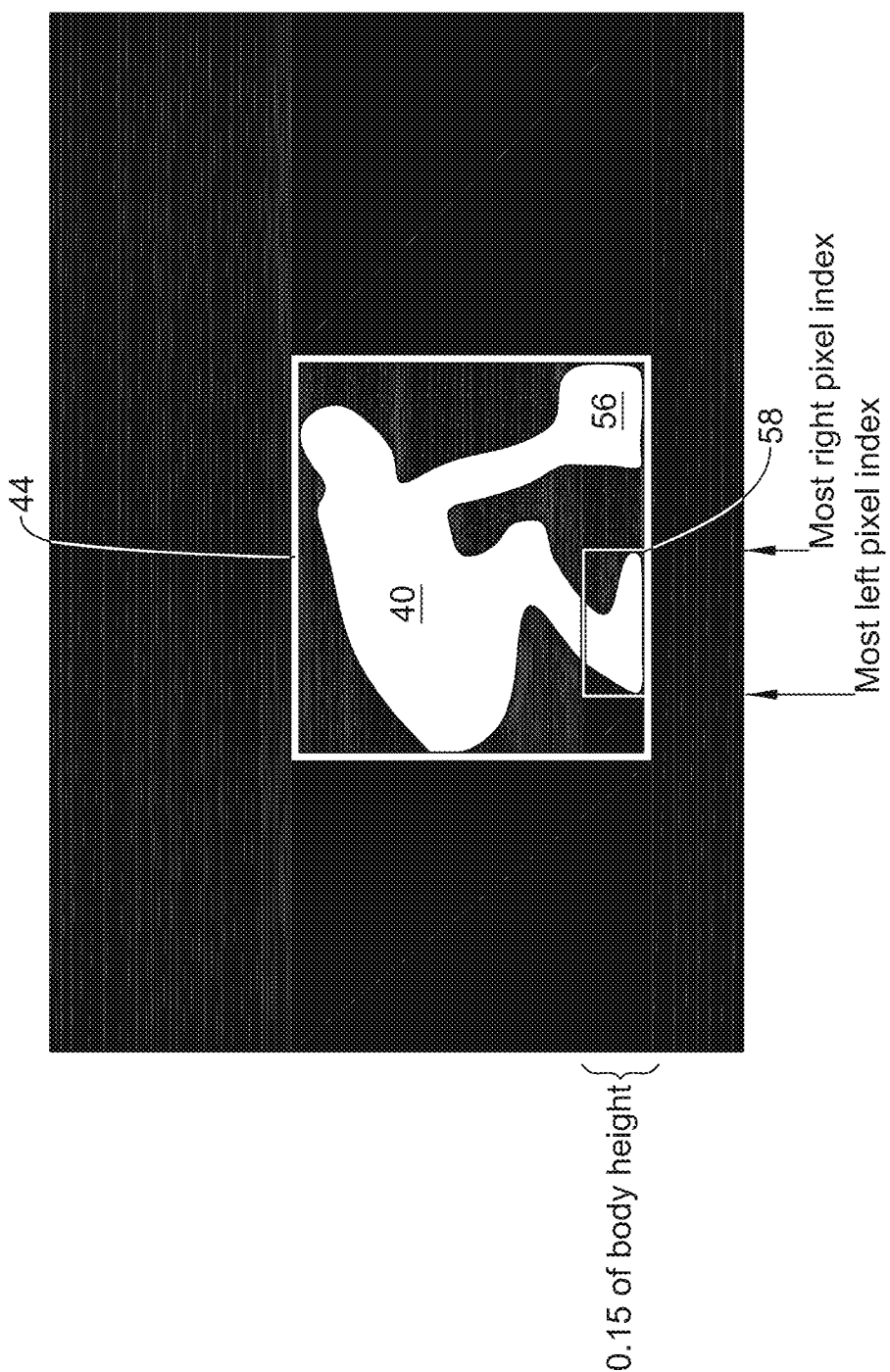
FIG. 15 is a schematic view of an illustrative segmented frame of video depicting a silhouette of a subject unloading an object and in which a feet location of the subject is being determined.

Before applying the above formula, however, the monitoring or tracking system 10 may need to determine a region of interest where the feet center may lie. This may be entered manually through a user interface or the monitoring or tracking system 10 may determine, on its own, the region of interest where the feet center lies. In one example, the monitoring or tracking system 10 may set the region of interest where the feet center lies as an area of the subject's feet and shanks (e.g., shins) as represented by the silhouette 40. FIGS. 14 and 15 depict the region of interest 58 of a silhouette 40 bounded with a bounding box 44 for determining a center of the feet when the silhouette 40 is beginning a task by loading an object represented by ghost effect 56 (FIG. 14) and when the silhouette 40 is ending a task by unloading the object represented by the ghost effect 56 (FIG. 15). The monitoring system 10 may then determine the mass center of this area using equation (3).

The shank and feet area (e.g., the region of interest) may be determined in any manner. In one example, a statistical method may be used to find the height of the shanks of the subject 2 as represented by the silhouette 40. For example, a shank height may be considered to be a percentage of a total height of the subject. In some cases, the shank height may be considered to be 0.10, 0.15, and/or other fraction of a height of the silhouette 40 of the subject 2. Thus, a vertical dimension of the region of interest where the feet center may lie may span from 0.15 of a height of the silhouette 40 of the subject 2 in the frame and a vertical dimension of the base of the bounding box 44. The horizontal dimension of the region of interest may span from a marginal pixel of the silhouette 40 in a x-positive direction (e.g., the most right pixel index) within the vertical dimension of the region of interest and a marginal pixel of the silhouette 40 in a x-negative direction (e.g., the most left pixel index) within the vertical dimension of the region of interest 58, as depicted in FIG. 14.

In the situation where the subject 2 may be squatting and working with an object 4 near the ground, as shown in FIG. 15, it is contemplated the hands of the silhouette 40 representing the subject 2 and/or the ghost effect 56 representing the object 4 may be located in the region of interest 58. To facilitate determining a horizontal location of the feet when the hands and/or the object are located in the region of interest 58, the region of interest 58 may be adjusted (e.g., horizontally reduced) based on a size of the object 4 as represented by the ghost effect 56. The size of the object 4 may be determined by multiplying a distance from the center of the ghost effect 56 (e.g., which may have been determined to locate the hands) to an edge of the bounding box 44 by two (2), as the outer edge of the object 4 may typically be considered a margin pixel defining an edge of the bounding box 44.

Once the region of interest 58 is identified, a distance between the hands and feet of the subject may be determined. The distance between the hands and feet of the subject may then be used to assess movement of the subject 2 in the video.

Although segmentation of frames of video facilitates identifying subjects 2 and objects 4 in video based on movement of the subjects 2 and/or objects 4 relative to a background, one limitation is that if one of the subjects 2 and/or objects 4 of interest, or portions thereof, stops moving for a set number of frames (e.g., a predetermined number of two or more frames, which may depend on a background update rate), that subject 2 and/or object 4, or portions thereof, may be absorbed into the background. As a result, features that are meant to be in the foreground and be identified or tracked may become background and untrackable. In one such instance, among others, feet may be stationary at one or more times while the subject 2 is performing a monitored task and thus, the feet may be absorbed into the background. Losing a location of the feet may be problematic because a useful measurement in monitoring the subject 2 performing a task is a horizontal and/or vertical distance between the subject's hands and feet, as discussed above. Additionally or alternatively, when the feet disappear from a foreground in segmented video, a bound around the subject 2 may change and the subject 2 may be assigned an inaccurate posture and/or other parameter measurements may be affected. Although the feet disappear from the silhouette 40 representing the subject 2 due to a lack of motion of the feet, temporal information and/or appearance information may be utilized to retrieve the feet and maintain the feet in the foreground when the feet are stationary.

To account for the situation when feet and/or other portions of a silhouette representing a subject disappear from the foreground when it is desirable for such portions of the silhouette to be in the foreground, a location of the feet and/or other portions of the subject may be identified by utilizing an estimation of the location of the feet. For example, a location of the feet and/or other portions of the subject in a previous frame and/or a function thereof may be added to and/or substituted into a current frame when the feet and/or other portions of the subject have disappeared from the foreground in the current frame. In some cases, Bayesian-based estimation may be utilized to ensure the foreground in each frame of video includes a silhouette of the feet of the subject. Although we discuss estimating locations of the feet of a subject, other portions of the subject may be located through estimation in a manner similar to as discussed herein with respect to the feet of the subject.

One example formula that may be used to estimate a location of the subject's feet is as follows:

$$\text{Posterior probability} = \text{prior probability} \times \text{likelihood} \quad (4)$$

where the prior probability term in equation (4) may be an estimated feet location of a silhouette 40 in a current frame of video based on a previous frame of video. In one example, the estimated feet location may be the location of the feet of the silhouette 40 (e.g., region of interest 58 or other location) in the previous frame or a different function of the location of the feet of the silhouette 40 in the previous frame. Because the feet may not move fast from frame-to-frame for a conventional video frame rate (e.g., a frame rate in a range from 15 frames per second (fps) to 30 fps), the difference between the feet location of a silhouette 40 in the current frame and that of the previous frame may be expected to be small (e.g., as measured in change of pixel locations from frame-to-frame), with an average of about zero (0) pixels. As such, a plausible location for a feet portion of the silhouette 40 in the current frame may be defined by a one or more pixels extending from the feet location of the silhouette 40 in a previous frame. As discussed above, the region of interest 58 may identify a plausible location of the feet of the subject 2 represented by the silhouette 40 in the current frame. This region of interest 58 may be the bottom 10% of the area covered by the bounding box of the previous frame (the area shares the same width and 0.1 of the height of the bounding box) or other suitable percentage of the area covered by the bounding box of the previous frame.

The likelihood term in equation (4) may be provided by motion information and appearance information. In some cases, the motion information and the appearance information may be weighted relative to each other, but this is not required. In one example, the appearance information may have a greater weight (e.g., have a higher priority) than the motion information. To compare a current frame appearance in the region of interest 58 with a previous frame appearance within the region of interest 58 (e.g., where the previous frame appearance within the region of interest 58 may be from a frame immediate before the current frame, may be from a frame at X-number of frames before the current frame, may be an average of previous frame appearances within the region of interest 58 over X-number of frames, a rolling average of previous frame appearances within the region of interest 58 over X-number of frames, or other suitable previous frame appearance within the region of interest 58), a pixel-by-pixel intensity cross-correlation of the region of interest 58 of the current frame and of the region of interest 58 of the previous frame may be utilized. If a confidence value of the cross-correlation (e.g., a confidence level obtained as a direct result of the pixel-by-pixel intensity cross-correlation as compared to an expected result of the pixel-by-pixel intensity cross-correlation) goes beyond (e.g., is greater than, as depicted in FIG. 15, or less than) a pre-set confidence threshold (e.g., the pre-set threshold may be set as 0.85, 0.9, 0.95, and/or set at one or more other suitable threshold values), then the feet portion of the silhouette in the region of interest 58 of the current frame may be estimated to be the same as that of the previous frame and the region of interest 58 of the previous frame may be utilized for the region of interest 58 of the current frame. This happens when the feet of the subject are steady and the motion information is disregarded. If the confidence value of cross-correlation has not reached (e.g., is lower than, as depicted in FIG. 15, or is greater than) the pre-set confidence threshold, then the feet portion of the silhouette 40 in the region of interest 58 for the current frame may be utilized as the feet of the silhouette 40 in the current frame. This happens when the feet of the subject 2 are moving and motion information is considered.

The pixel-by-pixel intensity cross-correlation and confidence level determination of the region of interest 58 in different frames of video may be performed using digital image correlation and tracking (DIC) techniques and/or other suitable cross-correlation techniques. Although cross-correlation and the use of confidence levels is discussed herein for comparing the regions of interest 58 in a current frame and a previous frame of video to determine feet locations of the subject 2, other comparing techniques may be utilized to determine locations of feet of the subject 2 and/or locations of other features of the subject 2.

Figure 16:
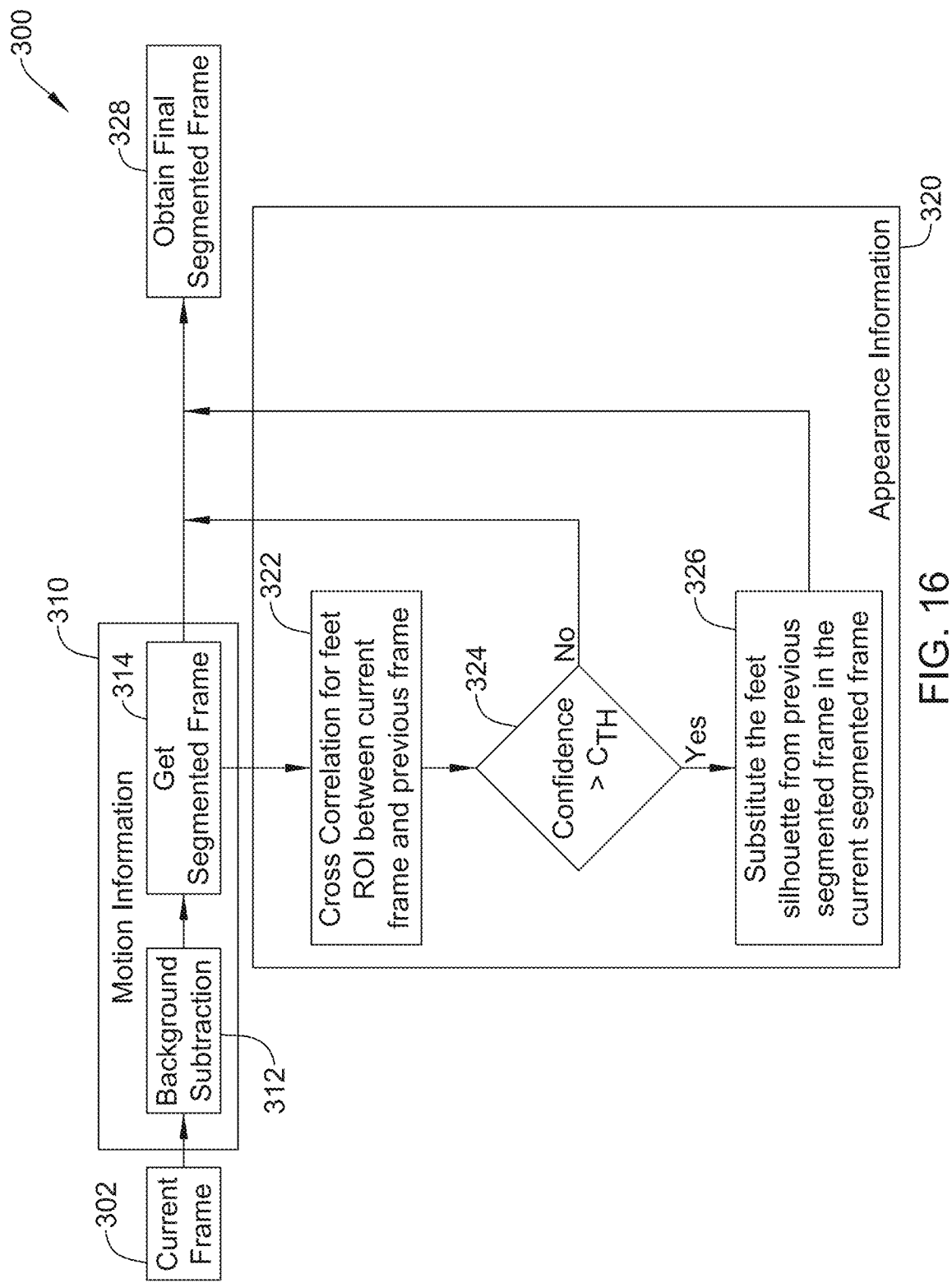
FIG. 16 is a schematic flow diagram of an illustrative method of representing portions of a subject in a frame of video.

FIG. 16 depicts a flow diagram of an approach 300 for ensuring feet of the subject 2 appear in the silhouette 40 even when the subject's feet are or are substantially static or stationary across a predetermined number of frames. In the approach 300, a current frame may be provided for analysis and background subtraction. As shown in a motion information box 310, background subtraction may be performed 312 on the frame to obtain 314 a segmented frame, including a region of interest 58 for the feet of the subject 2 represented by the silhouette 40. As shown in an appearance information box 320, a cross-correlation for the region of interest 58 in the segmented frame of the current frame and the region of interest 58 in a segmented frame of a previous frame may be obtained and a confidence level in the correlation may be determined and compared 324 to a confidence level threshold $C_{TH}$. In the case depicted in FIG. 16, the confidence level in the cross-correlation may be determined by comparing the result of the cross-correlation to an expected cross-correlation indicating the feet of the subject 2 as represented by the silhouette 40 have disappeared from the foreground in the current frame, but other arrangements for determining a confidence level are contemplated. When the determined confidence level has gone beyond (e.g., is greater than) the confidence level threshold $C_{TH}$, the region of interest 58 and/or a portion of the silhouette 40 within the region of interest 58 of the segmented previous frame may be substituted 326 into the segmented current frame and the final segmented frame may be obtained 328. When the determined confidence level has not gone beyond (e.g., is equal to or less than) the confidence level threshold $C_{TH}$, the region of interest 58 in the segmented current frame may be the obtained 328 final segmented frame. This technique for ensuring that stationary feet of the subject 2 appearing in a segmented frame when the feet have not moved or have not moved a threshold amount over a predetermined number of frames is an example technique, and other techniques are contemplated.

Video of a subject (e.g., the subject 2 and/or other suitable subject) performing a task may be used to determine asymmetry body twisting positions/angles of the subject. Asymmetry body twisting positions/angles of the subject may be determined (e.g., estimated or otherwise computed) using 3D coordinates of the subject's skeletal joints (e.g., angles, knees, hips, shoulders, elbows, wrists, etc.), where the asymmetry body twisting positions/angles may be used to determine an asymmetry angle of the subject at the beginning and/or ending of the task observed in the video. The asymmetry angle of the subject during the task may be used in the NIOSH Lifting Equation, discussed above, for determining a Recommended Weight Limit (RWL) and/or a Lifting Index for the task.

NIOSH has defined the asymmetry angle as how far an object a subject is lifting or is setting down during a task is displaced from a mid-sagittal plane of the subject at the beginning or end of the task, in degrees. Generally, an asymmetry angle of the subject performing the task may be an angle between an asymmetry line (e.g., a horizontal line joining a vertical line through a mid-point between inner ankle bones of the subject and a vertical line through a mid-point of hand grasps of an object by the subject during the task) and a mid-sagittal line of the subject (e.g., a line on the sagittal plane of the subject 2 passing through the middle point of the inner ankle bones of the subject) at the start of and end of the task (e.g., a twisting angle/position at the start of or end of the task). In one example of determining the asymmetry angle, the asymmetry line of the subject may be determined at an instance of a start of a task and an instance of an end of the task and the mid-sagittal line of the subject may be determined when the subject is in a neutral body position (e.g., when the subject 2 is positioned with its hands directly in front of the subject and there is minimal twisting at the legs, torso, or shoulders) at an instance before the start of the task and an instance before the end of the task at which both feet of the subject were at a same location as the feet are when the asymmetry line is determined at the start of the task and the end of the task, respectively. Alternatively or additionally, the mid-sagittal line of the subject may be determined at one or more other suitable instances.

In the approaches discussed herein, the asymmetry angle of the subject during the task (e.g., the twisting angle/position of the subject at the beginning and ending of a task) may be determined or estimated as an angle between 1) a horizontal line joining a vertical line through a mid-point between hip joints of the subject and a vertical line through a mid-point between wrist joints of the subject and 2) the mid-sagittal line of the subject. The left and right hip joints (e.g., a first set of features) and the left and right wrist joints (e.g., a second set of features) are utilized as key body feature points for determining a twisting angle/position due to these body feature points often being observable while the subject performs the task. It is believed the hip joints may provide a suitable estimation of ankle location because if there is no foot movement, the angle location and hip location should be nearly identical. It is believed the wrist joints may provide a suitable estimations of hand locations as wrist joints are directly adjacent hands of the subject and more visible in captured video. If visible in the video, other body feature points may be utilized to determine twisting angles/positions of the subject during the task and when visible, may provide advantages over using locations of hip joints and wrist joints.

Figure 17:
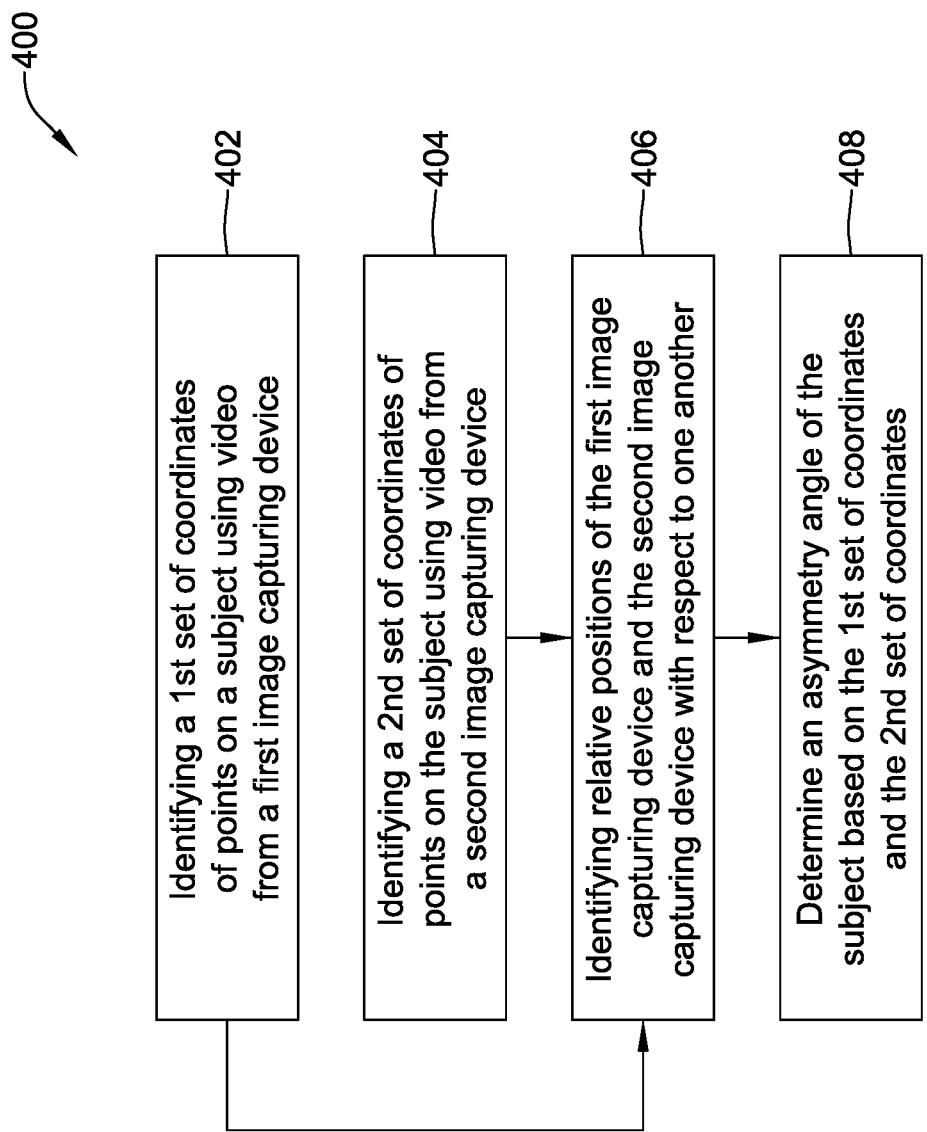
FIG. 17 is a schematic flow diagram of an illustrative approach for analyzing video of a subject performing a task.

FIG. 17 is an approach 400 utilizing a monitoring system (e.g., the monitoring system 10 and/or other suitable monitoring system) having two image capturing devices (e.g., two image capturing devices 12 and/or other suitable image capturing devices) to assess movement of a subject during an event of interest (e.g., a lifting task in which the subject performs a lift one or more times or other suitable event of interest). The approach 400 may be performed automatically without any user input or may include at least some user input. Although not shown, the approach 400 may include receiving video of a task being performed by a subject (e.g., the subject 2 and/or other suitable subject) from a first image capturing device (e.g., the first image capturing device 12a and/or other suitable image capturing device 12) and a second image capturing device (e.g., the second image capturing device 12b and/or other suitable image capturing device 12), where frames of the video from the first image capturing device and the second image capturing device may be synchronized relative to each other. Although two image capturing devices are utilized in the approach 400, a single image capturing device or additional image capturing devices may be utilized.

In the method 400, the monitoring system (e.g., a non-transitory computer readable medium having instructions stored thereon to perform the techniques discussed herein of the monitoring system 10 and/or other suitable monitoring system) may be configured to identify 402 a first set of coordinates of body feature points on the subject (e.g., where the body feature points may include a first set of features, such as a left hip joint and a right hip joint, and a second set of features, such as a left wrist joint and a right wrist joint) using video from the first image capturing device and identify 404 a second set of coordinates of the body feature points on the subject using video from the second image capturing device. In the examples discussed herein, the identified coordinates of the body feature points on the subject may be two-dimensional coordinates (e.g., 2D coordinates on the x-axis and y-axis) on a pixel coordinate system in each frame of video from the first and second image capturing devices.

Body feature points may be key points (e.g., left ankle joint, right ankle joint, left knee joint, right knee joint, left hip joint, right hip joint, left shoulder joint, right shoulder joint, left elbow joint, right elbow joint, left wrist joint, right wrist joint, etc.) on a subject for determining a body asymmetry angle of the subject performing the task. Key points on the subject may be points on the subject that can be used to produce a suitable estimation of the body asymmetry angle of the subject performing the task. In one example, the key points may include, but are not limited to, a left hip joint and a right hip joint (e.g., used to determine or estimate a mid-sagittal line of the subject 2) and a left wrist joint and a right wrist joint (e.g., used to determine or estimate a location between hands grasping an object during the task).

The monitoring system may utilize any suitable technique for determining coordinates of key body features points of the subject in obtained video, including, but not limited to, one or more publically available software tools that may be available to track features in video. In some cases, the above-discussed ghost effect monitoring/tracking may be utilized to determine 2D coordinates of body features points on the subject (e.g., hand location, feet location, etc.) In one additional or alternative example, OPENPOSE software may be applied to the received videos to determine the 2D coordinates of key body feature points on the subject. OPENPOSE software is an open-source computer vision algorithm software that may be capable of estimating 2D coordinates of 25 skeletal joints on each frame of recorded video. Other approaches and/or techniques for estimating 2D coordinates of key body features points on the subject 2 in video of the subject performing the task may be utilized.

To facilitate determining 3D coordinates of the key body feature points on the subject and twisting angles/positions of the subject, positions of the first image capturing device and the second image capturing device with respect to one another and/or a captured scene may be identified 406. The monitoring system 10 may be configured to identify 406 relative positions of the first image capturing device and the second image capturing device capturing video of the subject performing the task using any suitable technique. Further, although two image capturing devices are discussed as being used to facilitate determining coordinates of body features points, other suitable numbers of image capturing devices and/or other suitable video analysis techniques utilizing other suitable numbers of image capturing devices may be utilized to determine body features of the subject performing the task.

The identifying 406 relative positions of the image capturing devices may be an optional step that is performed, for example, at an initial set up of the monitoring system or a first time a particular camera setup is utilized for capturing a scene. That is, in one example, once relative positions of the first image capturing device and the second capturing device are known, it may not be necessary to further identify 406 the relative positions of the image capturing devices unless it is desirable to confirm the known relative positions and/or desirable for one or more other suitable reasons.

In one example approach for determining positions of the imaging capturing devices, Structure from Motion (SfM) techniques may be utilized to identify relative positions/locations (e.g., positions and poses and/or other suitable positions/locations) of the first and second image capturing devices with respect to one another and/or a captured scene. SfM is a computer vision technique used to jointly calibrate a pair of image capturing devices to facilitate estimating the 3D positions of a set of feature points jointly shared by views of the image capturing devices. SfM may include the steps of 1) feature extraction and matching (e.g., extracting corresponding feature points from video frames of first and second image capturing devices), and 2) Relative image capturing device pose estimation (e.g., estimating the image capturing device poses and positions using epipolar geometry). Various SfM formations and corresponding implementations are available as open-source software and/or proprietary software. One example SfM tool is from MATLAB™, but other SfM tools are contemplated.

In some cases, one or more types of feature points may be extracted from the video and used in an SfM technique. For example, background features points and/or body feature points may be extracted during an SfM technique to establish relative poses or positions of the image capturing devices relative to one another.

The feature extraction and matching step of SfM may utilize a Harris feature extractor to detect a set of distinct 2D background feature points in each frame of video from the two image capturing devices, but this is not required in all cases. The outcome may include a set of 2D coordinates and corresponding feature descriptor vectors for the background feature points. A Random Sample Consensus (RANSAC) feature matching algorithm may use the set of 2D coordinates and corresponding feature descriptor vectors to establish a correspondence of detected 2D feature points from the video of each image capturing device. These background features points may be used to establish the relative image capturing device poses (e.g., extrinsic parameters) at frames associated with a beginning (e.g., a lifting frame) and/or an ending (e.g., a setting down frame) of a task.

Although not required, coordinates of body feature points identified 402, 404, as discussed above, may be utilized here to facilitate determining the relative positions of the first and second image capturing devices with respect to one another. Alternatively or additionally, coordinates of other or additional body feature points may be identified at this point to facilitate determining the relative positions of the first and second image capturing devices with respect to one another. In some cases, body feature points of the subject may not be utilized to determine relative positions of the first and second image capturing devices with respect to one another and such relative positions may be determined based solely or primarily on background feature points discussed above and/or other suitable feature points.

When estimating or determining the relative image capturing device pose of each of the first and second image capturing devices with respect to one another, an epipolar constraint may be utilized. The variables $\tilde{x}$ and $\tilde{x}'$ may denote, respectively, 3D homogeneous image coordinates at the first image capturing device and the second image capturing device corresponding to the same 3D points. The relative pose of second image capturing device (e.g., unknown) with respect to the first image capturing device (e.g., reference) may be represented by a rotation matrix (R) and a translation vector (t). An essential matrix may be defined as:

$$E=[t]_x R, \qquad (1)$$

where $[t]_x$ is a 3×3 cross-product matrix defined by elements of the vector t. The epipolar constraint stipulates that:

$$\tilde{x}^T E \tilde{x}'=0 \qquad (2)$$

Given 8 or more pairs of corresponding feature points $\tilde{x}$ and $\tilde{x}'$ (e.g., one or both of background features points and body feature points), the essential matrix E may be estimated using singular value decomposition. Then, the image capturing device pose rotation matrix R and translation vector t can be derived accordingly.

Once the relative pose of the first and second image capturing devices has been determined, 3D coordinates of the key body feature points may be determined. For example, given a pair of calibrated image capturing devices (e.g., where the number of image capturing devices K is known, such as i=1, 2, and R and t are known), the 3D coordinates of body feature points of interest (e.g., key body feature points, such as a left hip joint, a right hip joint, a left wrist, a right wrist) may be determined from the 2D coordinates for those body feature points of interest previously identified using a triangulation technique and/or one or more other suitable techniques.

Triangulation in computer vision or video analysis may refer to a process of determining a point in a 3D space based on video from two or more perspectives capturing the point (e.g., based on video from two or more image capturing devices 12). An example triangulation technique for determining 3D coordinates of body feature points of interest is discussed below.

In the example triangulation technique, a vector p may be denoted as a 4×1 homogeneous coordinate of a 3D point whose homogeneous image coordinate is $\tilde{x}$, where:

$$\tilde{x} = \alpha \begin{bmatrix} x_k \\ y_k \\ 1 \end{bmatrix} = K \cdot [R\,t] p = Mp = \begin{bmatrix} m_1^T p \\ m_2^T p \\ m_3^T p \end{bmatrix} \qquad (3)$$

Matrix M may be a 4×3 matrix and $m_i^T$, $i=1, 2, 3$ are the three rows of the M matrix. The 2D coordinate of the $k^{th}$ body feature point corresponding to p may be $(x_k, y_k)$ a may be a constant relating to a depth of p. Hence:

$$x_k=(m_1^T p)/(m_3^T p) \text{ and } y_k=(m_2^T p)/(m_3^T p) \quad (4)$$

In other words, $$\begin{cases} (m_1^T p) - x_k \cdot (m_3^T p) = 0 \\ (m_2^T p) - y_k \cdot (m_3^T p) = 0 \end{cases} \quad (5)$$

Or, in matrix form:

$$\underbrace{\begin{bmatrix} 1 & 0 & -x_k \\ 0 & 1 & -y_k \end{bmatrix}}_{H_k} \begin{bmatrix} m_1^T \\ m_2^T \\ m_3^T \end{bmatrix} p = H_k M p = 0 \quad (6)$$

Both of $H_k$ and M may be known. $H_k$ is a matrix formed for computational convenience and includes the known coordinates coordinate $(x_k, y_k)$ and 0, 1. M is a matrix containing the parameters of the image capturing device. $G_k$ may be a matrix of a same format as $H_k$ formed by the pixel coordinates of the body feature point $(x_k', y_k')$ at the other image capturing device corresponding to p. L is the parameter matrix corresponding to this image capturing device. Then:

$$\begin{bmatrix} H_k & M \\ G_k & L \end{bmatrix}_{4 \times 4} p_{4 \times 1} = M'_{4 \times 4} p_{4 \times 1} = 0 \quad (7)$$

The matrix M' may be rank-deficient. One may solve p as the right singular vector corresponding to the minimum singular value of the matrix M'. This process may be repeated to estimate the 3D coordinates of each of the desired body feature points. As discussed above, the body feature points of interest for determining a twisting angle/position of the subject at the beginning and/or end of a task (e.g., the asymmetry angle), may be the left hip joint, the right hip joint, the left wrist joint, and the right wrist joint.

Based on the first set of coordinates (e.g. the first set of 2D coordinates) for the body feature points (e.g., the key body feature points and/or other suitable body feature points) from the first image capturing device and the second set of coordinates (e.g., the second set of 2D coordinates) for the body feature points from the second image capturing device, a body asymmetry angle of the subject in the video captured by the first and second image capturing devices may be determined 408. For example, using the first set of coordinates and the second set of coordinates for the body feature points, the 3D coordinates of body feature points of the subject may be determined, as discussed above. Once the 3D coordinates of body feature points (e.g., left hip joint, right hip joint, left wrist joint, right hip joint, etc.) of the subject have been determined, a twisting angle/position of the subject may be determined for one or more of the frames of the video. In one example, as discussed above, the twisting angle/position of the subject may be an angle between 1) a horizontal line joining a vertical line through a mid-point between the 3D coordinates of the hip joints of the subject and a vertical line through a mid-point between 3D coordinates of the wrist joints of the subject, and 2) the mid-sagittal line of the subject. The determined 408 body asymmetry angle of the subject may then be calculated as the twisting angle/position of the subject in frames of video from the image capturing devices that include a beginning of a task (e.g., an initial lifting or grasping of an object) or an ending of the task (e.g., a setting down or releasing of the object lifted).

The beginning of the task and/or the ending of the task may be determined in any suitable manner. For example, frames of video from one or both of the image capturing devices that include the beginning and/or ending of the task may be determined using the techniques discussed herein (e.g., initial identification of ghost effects, etc.) and/or other suitable techniques including, but not limited, to manual identification and/or automated identification via suitable computer vision analyses in addition to those discussed herein.

As discussed herein, the asymmetry angle measurements and estimations may be used in the NIOSH lifting equation to provide a more accurate RWL and/or LI. In some cases, as a task performed by a subject may be defined as spanning from a lifting or grasping of an object by the subject to a setting down or releasing of the object. When video captures a task being repeated by the subject, an average of the determined asymmetry angle of the subject at the beginning of the task and/or an average of the determined asymmetry angle of the subject at the end of the task may be used in the NIOSH lifting equation to determine the RWL or LI for the task. Alternatively or additionally, a maximum asymmetry angle, a minimum asymmetry angle, a mode asymmetry angle, and/or other suitable statistics relative to the determined asymmetry angles for the beginning and/or ending of the task and determined from captured video may be utilized in the NIOSH lifting equation as the asymmetry angles at the start and/or end of the observed task to identify the RWL and/or the LI for the task.

FIG. 18 is an approach 500 utilizing the monitoring system 10 to assess movement of a subject during an event of interest (e.g., a lifting task or other event of interest). Although not shown, the approach 500 may include receiving a video including an event of interest. The monitoring system 10 (e.g., a non-transitory computer readable medium having instructions stored thereon to perform the techniques discussed herein) may compare 502 pixels in frames of video to possible pixel values based on an identified distribution to identify a subject within the frames of the video. As discussed above, the monitoring system 10 may compare successive frames of the video by comparing corresponding pixels of the successive frames and/or by comparing the frames in one or more other manners. Once the subject has been identified, a beginning of an event of interest and an ending of the event of interest may be determined 504 (e.g., by identifying ghost effects and/or with one or more other techniques). The event of interest may be any event involving the subject. In some cases, the event of interest may be a lifting task that is repeated over time. The techniques discussed herein and/or other techniques may be utilized to determine a beginning and/or an ending of an event of interest. One or more coordinates (e.g., marginal pixels, center of pixel mass, joint locations and/or other body feature point locations, etc.) of a subject within a frame may be identified and/or tracked 506 through a plurality of frames of the video as the subject moves within the frames over a period of time from the beginning of the event of interest and the end of the event of interest. When the event of interest involves a lifting task, the subject may be tracked from a location at which an object is picked up (e.g., loaded)

until a location at which the object is set down (e.g., unloaded). Further, if the event of interest is repeated, the subject may be tracked while the event of interest is repeated. Then, based on coordinates of the subject during the event of interest and extracted information (as discussed herein) based on the identified coordinates, the monitoring system 10 may perform 508 an assessment of movement of the subject during the event of interest.

In some cases, the monitoring system 10 may identify or extract parameter values from the video including, but not limited to, frequency (e.g., from the horizontal location tracking), speed (e.g., an amount of time between a beginning of an event and an end of the event), acceleration, positioning, and/or other parameter of the subject during the event of interest. Based on these parameters, posture, distance between hands and feet of the subject, trunk angle, twisting position/angle, asymmetry angle, and/or other suitable parameters, the monitoring system 10 may determine a recommended weight limit, a lifting index, and/or perform one or more other assessments of movements of the subject during the event of interest. The monitoring system may then provide an output (e.g., an alert, report, etc.) in response to the assessment and/or save the assessment to memory. Further, the monitoring system 10 may be configured to capture and/or receive video in real time during an event of interest and perform real time processing and/or assessments, in accordance with the approach 500 and as discussed herein, with the goal of preventing injuries and/or mitigating risks during the event of interest.

Further, during the process of the monitoring or tracking system 10 processing the video, the video may be converted to frames similar to as depicted in FIGS. 7, 8, 11A-11E, 13, and 14, where the background and the foreground have been distinguished, and displayed on a display (e.g., the display 30 or other display) for observation while the monitoring system analyzes the video. Alternatively, the original video may be displayed and the comparison of corresponding pixels in successive frames may be done in a process that is not displayed. Further, one or more of the bounding step and the hand location step (e.g., marking of an identified center of the hands) may be depicted on a display even if the comparison of corresponding pixels in successive frames is not depicted in a manner similar to what is depicted in FIGS. 7, 8, 11A-11E, 13, and 14, but rather the original video is displayed if any video is displayed. In some cases, the monitoring system 10 may output via the output port 22 assessments and/or alerts based on assessments without displaying a portion of, or any portion of, an analysis of the video.

Although the monitoring system 10 is discussed in view of manual lifting tasks, similar disclosed concepts may be utilized for other tasks involving movement. Example tasks may include, but are not limited to, manual lifting, sorting, typing, performing surgery, throwing a ball, etc. Additionally, the concepts disclosed herein may apply to analyzing movement of people, other animals, machines, and/or other devices.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A sensor-less subject tracking system comprising:
an input port for receiving video of a subject performing a task, the video includes a first video from a first camera and a second video from a second camera;
a controller in communication with the input port, the controller is configured to:
determine a position of the first camera relative to a position of the second camera based on the first video and the second video;
determine three-dimensional locations of a first set of features of the subject performing the task in the video based on the position of the first camera relative to the position of the second camera, the first set of features as captured in the first video, and the first set of features as captured in the second video;
determine three dimensional locations of a second set of features of the subject performing the task in the video based on the position of the first camera relative to the position of the second camera, the second set of features as captured in the first video, and the second set of features as captured in the second video;
identify one of a beginning of the task performed by the subject in the video and an ending of the task performed by the subject in the video; and
determine a twisting position of the subject performing the task in the video based on the determined three-dimensional locations of the first set of features of the subject performing the task in the video and the determined three-dimensional locations of the second set of features of the subject performing task in the video; and
wherein the controller is configured to determine the twisting position of the subject performing the task in the video without data from sensors configured to be worn by the subject.

2. The system of claim 1, wherein the twisting position of the subject performing the task in the video is determined for a time when each of the identified one of the beginning of the task performed by the subject in the video and the ending of the task performed by the subject in the video occurs.

3. The system of claim 1, wherein the controller is configured to:
identify a frame in the video at which the identified one of the beginning of the task performed by the subject in the video and the ending of the task performed by the subject in the video occurs; and
determine the twisting position of the subject in the frame in the video at which the identified one of the beginning of the task performed by the subject in the video and the ending of the task performed by the subject in the video occurs.

4. The system of claim 1, wherein the controller is configured to identify the one of the beginning of the task performed by the subject in the video and the ending of the task performed by the subject in the video based on determining when a ghost effect first appears in the video.

5. The system of claim 4, wherein the controller is configured to determine a frame in the video at which the ghost effect first appears and identify the frame as when the identified one of the beginning of the task performed by the subject in the video and the ending of the task performed by the subject in the video occurs.

6. The system of claim 4, wherein the controller is configured to:
identify when the task begins based on determining a frame in the video in which a first ghost effect first appears; and identify when the task ends based on determining a frame in the video in which a second ghost effect first appears.

7. The system of claim 4, wherein the controller is configured to identify a location of hands of the subject in the video at the identified one of the beginning of the task performed by the subject in the video and the ending of the task performed by the subject in the video based on a location of the ghost effect in the digital video.

8. The system of claim 7, wherein the controller is configured to determine the twisting position of the subject performing the task in the video based on the location of hands of the subject in the video at the identified one of the beginning of the task performed by the subject in the video and the ending of the task performed by the subject in the video.

9. The system of claim 1, wherein the task is a lifting task and the controller is configured to:
 identify the beginning of the task performed by the subject in the video by identifying a beginning of a lift performed by the subject in the video; and
 identify the ending of the task performed by the subject in the video by identifying an ending of the lift.

10. The system of claim 1, wherein the controller is configured to:
 identify a location of a first feature of the subject in a frame of the video;
 identify a location of a second feature of the subject in the frame of the video; and
 determine the twisting position of the subject in the frame of the video based on the identified location of the first feature of the subject and the identified location of the second feature of the subject.

11. A computer readable medium having stored thereon in a non-transitory state a program code for use by a computing device, the program code causing the computing device to execute a method for tracking a subject in video comprising:
 identifying a subject within a frame of video, the video includes a first video from a first camera and a second video from a second camera;
 identifying one of a beginning of a task performed by the subject in the video and an ending of the task performed by the subject in the video;
 determining a position of the first camera relative to a position of the second camera based on the first video and the second video;
 determining three-dimensional locations of a first set of features of the subject performing the task in the video based on the position of the first camera relative to the position of the second camera, the first set of features as captured in the first video, and the first set of features as captured in the second video; and
 determining three dimensional locations of a second set of features of the subject performing the task in the video based on the position of the first camera relative to the position of the second camera, the second set of features as captured in the first video, and the second set of features as captured in the second video; and
 determining a twisting position of the subject performing the task in the video based on the determined three-dimensional locations of the first set of features of the subject performing the task in the video and the determined three-dimensional locations of the second set of features of the subject performing task in the video.

12. The computer readable medium of claim 11, wherein determining the twisting position of the subject performing the task in the video includes determining the twisting position of the subject performing the task in the video for a time at which the identified one of the beginning of the task performed by the subject in the video and the ending of the task performed by the subject in the video occurs.

13. The computer readable medium of claim 11, the method for tracking a subject in the video further comprises:
 identifying a frame in the video at which the identified one of the beginning of the task performed by the subject in the video and the ending of the task performed by the subject in the video occurs; and
 determining the twisting position of the subject in the frame in the video at which the identified one of the beginning of the task performed by the subject in the video and the ending of the task performed by the subject in the video occurs.

14. The computer readable medium of claim 11, wherein the identifying the one of a beginning of the task performed by the subject in the video and an ending of the task performed by the subject in the video is based on when a ghost effect first appears in the video.

15. The computer readable medium of claim 11, the method for tracking a subject in the video further comprises:
 identifying a location of a first feature of the subject in a frame of the video;
 identifying a location of a second feature of the subject in the frame of the video; and
 wherein the determining the twisting position of the subject in the frame of the video is based on the identified location of the first feature of the subject and the identified location of the second feature of the subject.

16. A sensor-less tracking system comprising:
 a processor; and
 memory in communication with the processor, the memory includes instructions executable by the processor to:
  determine three-dimensional coordinates of body feature points of a subject in video, wherein the video includes a first video from a first camera and a second video from a second camera and determining three-dimensional coordinates of body feature points of the subject in video comprises:
   determining a position of the first camera relative to a position of the second camera based on the first video and the second video;
   determining three-dimensional coordinates of a first set of body feature points of the subject in the video based on the position of the first camera relative to the position of the second camera, the first set of body feature points as captured in the first video, and the first set of body feature points as captured in the second video; and
   determining three dimensional coordinates of a second set of features of the subject in the video based on the position of the first camera relative to the position of the second camera, the second set of body feature points as captured in the first video, and the second set of body feature points as captured in the second video; and
  determine a body asymmetry angle of the subject in the video based on the three-dimensional coordinates of the first set of body feature points of the subject in the video and the three-dimensional coordinates of the second set of body feature points of the subject in the video; and wherein the three-dimensional coordinates of body feature points of the subject in the video are determined without data from sensors configured to be worn by the subject.

17. The system of claim 16, wherein the memory further includes instructions executable by the processor to:
identify two-dimensional coordinates of the body feature points of the subject in the video; and
determine the three-dimensional coordinates of the body feature points of the subject based on the two-dimensional coordinates of the body feature points of the subject.

18. The system of claim 17, wherein to identify the two-dimensional coordinates of body feature points of the subject in the video, the memory includes further instructions executable by the processor to:
identify a first set of two-dimensional coordinates of the body feature points of the subject in two-dimensional video from a first camera; and
identify a second set of two-dimensional coordinates of the body feature points of the subject in two-dimensional video from a second camera; and
wherein the three-dimensional body feature points of the subject are determined based on the first set of two-dimensional coordinates of the body feature points of the subject and the second set of two-dimensional coordinates of the body features points of the subject.

19. A marker-less subject tracking system comprising:
an input port for receiving video of a subject performing a task;
a controller in communication with the input port, the controller is configured to:
identify one of a beginning of the task performed by the subject in the video and an ending of the task performed by the subject in the video;
identify a frame in the video at which the identified one of the beginning of the task performed by the subject in the video and the ending of the task performed by the subject in the video occurs; and
determine a twisting position of the subject in the frame in the video at which the identified one of the beginning of the task performed by the subject in the video and the ending of the task performed by the subject in the video occurs.

20. A marker-less subject tracking system comprising:
an input port for receiving video of a subject performing a task;
a controller in communication with the input port, the controller is configured to:
identify one of a beginning of the task performed by the subject in the video and an ending of the task performed by the subject in the video based on determining when a ghost effect first appears in the video;
identify a location of hands of the subject in the video at the identified one of the beginning of the task performed by the subject in the video and the ending of the task performed by the subject in the video based on a location of the ghost effect in the digital video; and
determine a twisting position of the subject performing the task in the video based on the location of hands of the subject in the video at the identified one of the beginning of the task performed by the subject in the video and the ending of the task performed by the subject in the video.

21. A marker-less subject tracking system comprising:
an input port for receiving video of a subject performing a task, the video includes a first video from a first camera and a second video from a second camera;
a controller in communication with the input port, the controller is configured to:
identify one of a beginning of the task performed by the subject in the video and an ending of the task performed by the subject in the video;
determine a position of the first camera relative to a position of the second camera based on the first video and the second video;
determine three-dimensional locations of a first set of features of the subject performing the task in the video based on the position of the first camera relative to the position of the second camera, the first set of features as captured in the first video, and the first set of features as captured in the second video;
determine three dimensional locations of a second set of features of the subject performing the task in the video based on the position of the first camera relative to the position of the second camera, the second set of features as captured in the first video, and the second set of features as captured in the second video; and
determine a twisting position of the subject performing the task in the video based on the determined three-dimensional locations of the first set of features of the subject performing the task in the video and the determined three-dimensional locations of the second set of features of the subject performing task in the video.

22. A computer readable medium having stored thereon in a non-transitory state a program code for use by a computing device, the program code causing the computing device to execute a method for tracking a subject in video comprising:
identifying a subject in a video;
identifying one of a beginning of a task performed by the subject in the video and an ending of the task performed by the subject in the video;
identifying a frame in the video at which the identified one of the beginning of the task performed by the subject in the video and the ending of the task performed by the subject in the video occurs; and
determining a twisting position of the subject in the frame in the video at which the identified one of the beginning of the task performed by the subject in the video and the ending of the task performed by the subject in the video occurs.

* * * * *